Aug. 28, 1962  J. R. DINNING  3,051,268
ELEVATOR CONTROL SYSTEM
Filed Oct. 27, 1959  12 Sheets-Sheet 11
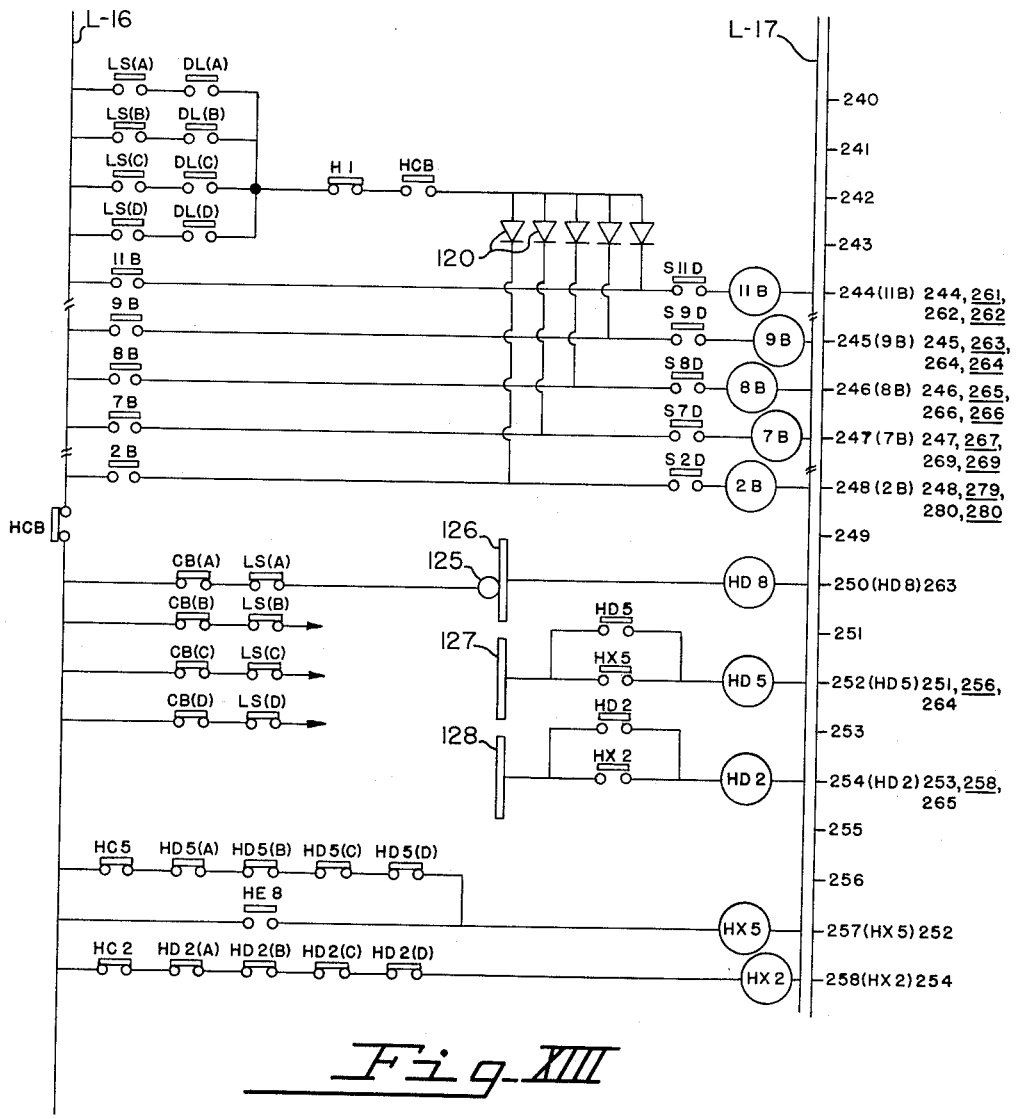
Fig. XIII
INVENTOR.
JOHN R. DINNING
BY
Marshall, Marshall & Yeasting
ATTORNEYS Aug. 28, 1962 — J. R. DINNING — 3,051,268
ELEVATOR CONTROL SYSTEM
Filed Oct. 27, 1959 — 12 Sheets-Sheet 12
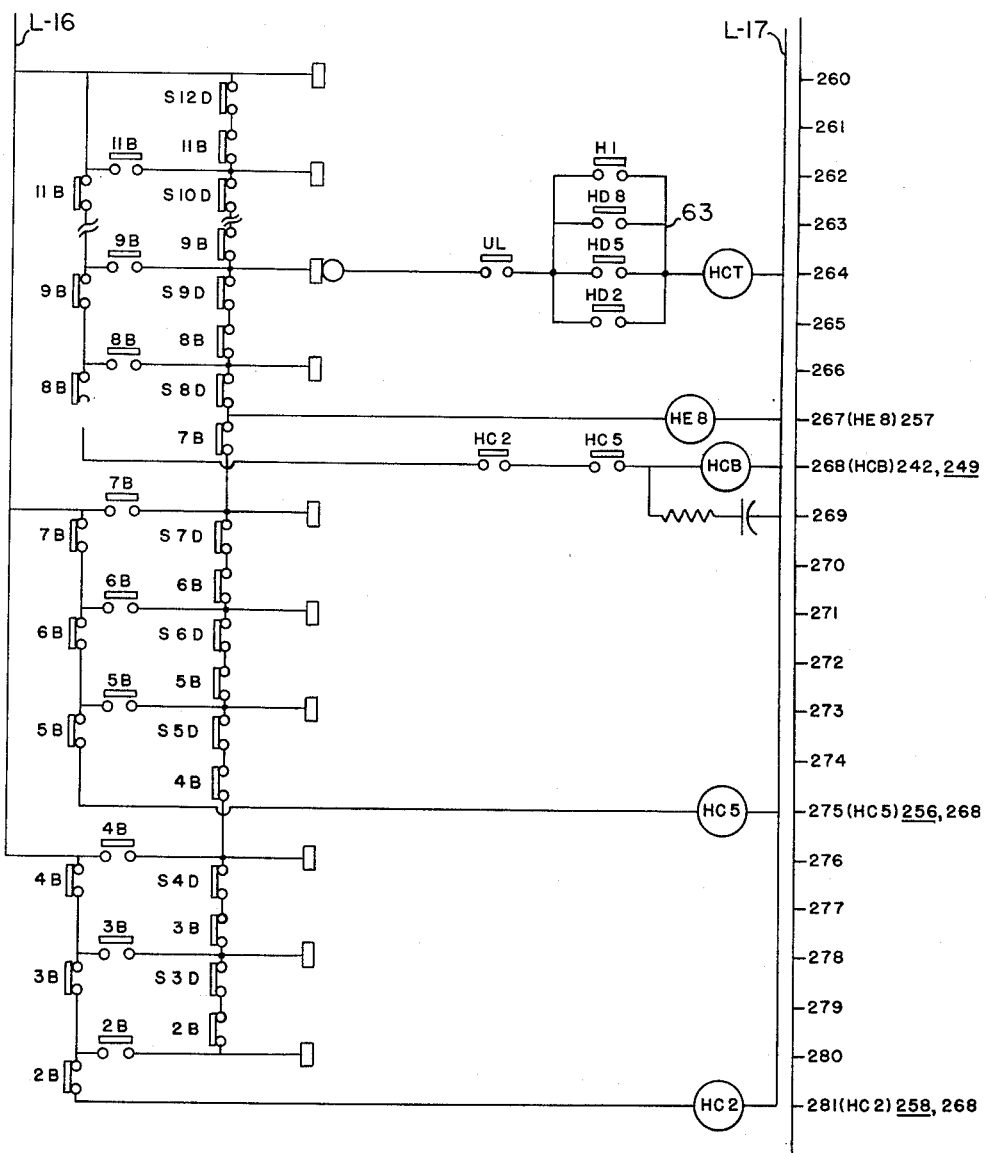
Fig. XIV
INVENTOR.
JOHN R. DINNING
BY
Marshall, Marshall & Yeasting
ATTORNEYS ated Aug. 28, 1962

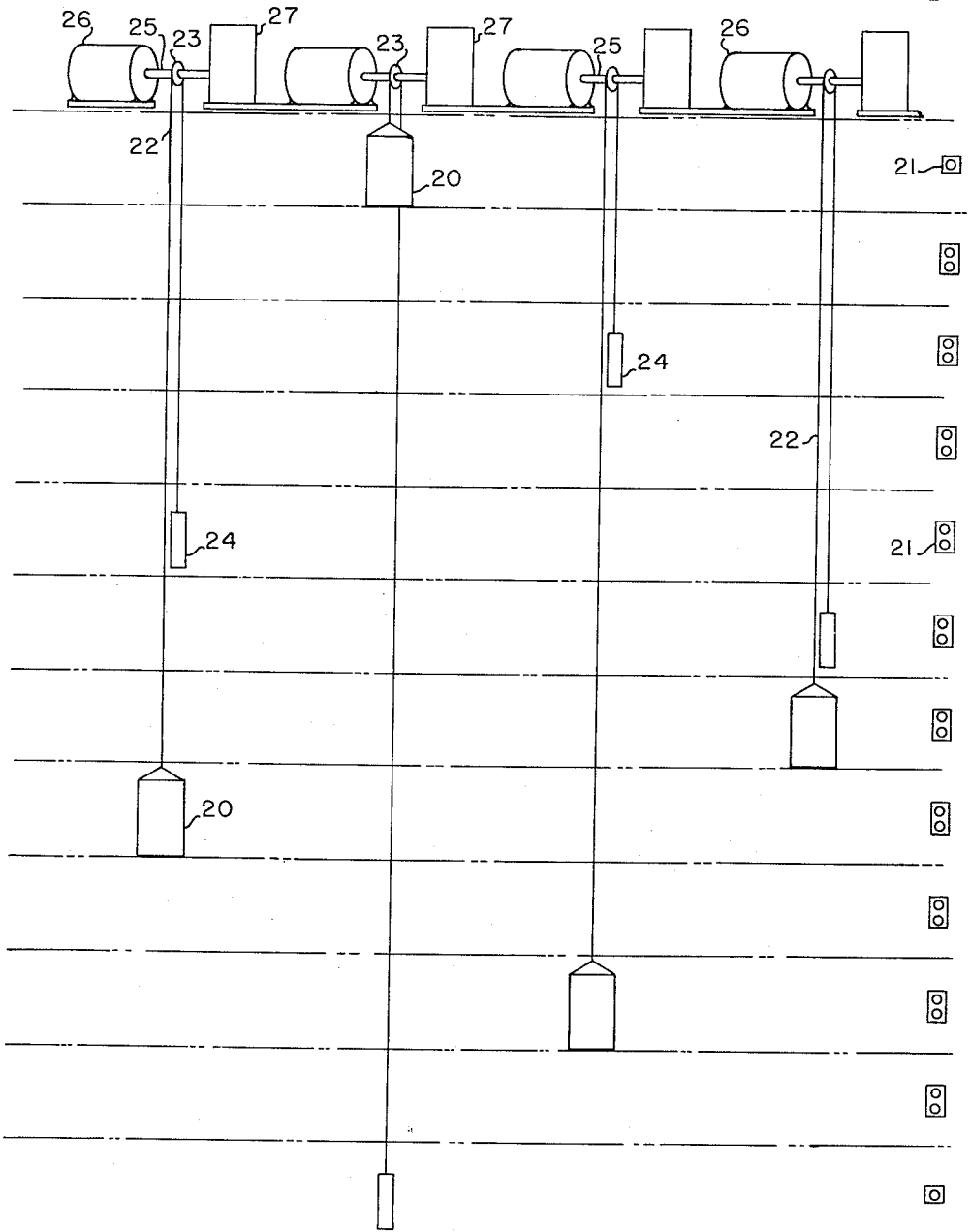

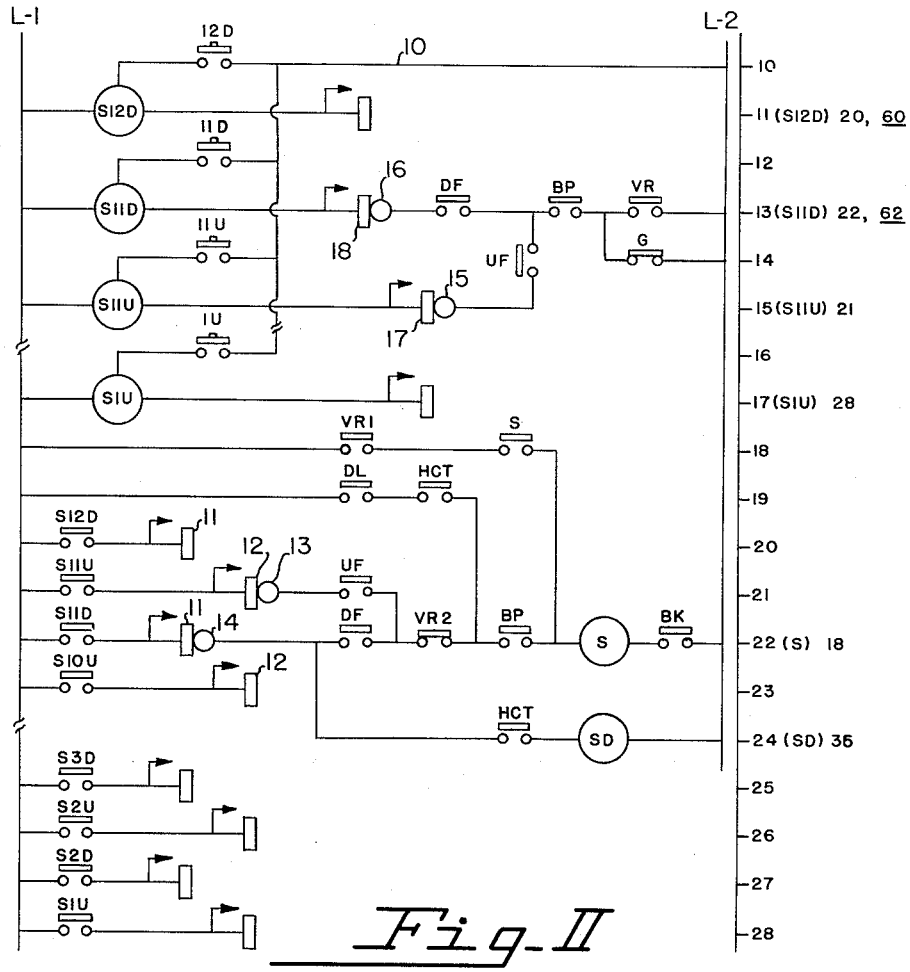
Fig. II
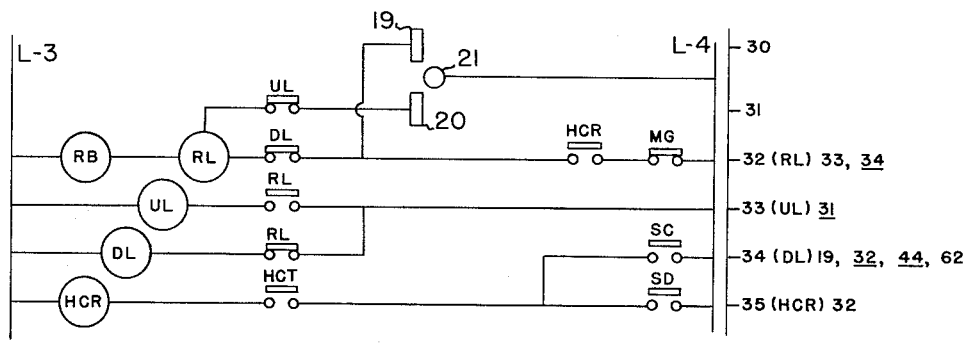
Fig. IIa
INVENTOR.
JOHN R. DINNING
BY
Marshall, Marshall & Yeasting
ATTORNEYS Aug. 28, 1962 J. R. DINNING 3,051,268
ELEVATOR CONTROL SYSTEM
Filed Oct. 27, 1959 12 Sheets-Sheet 3
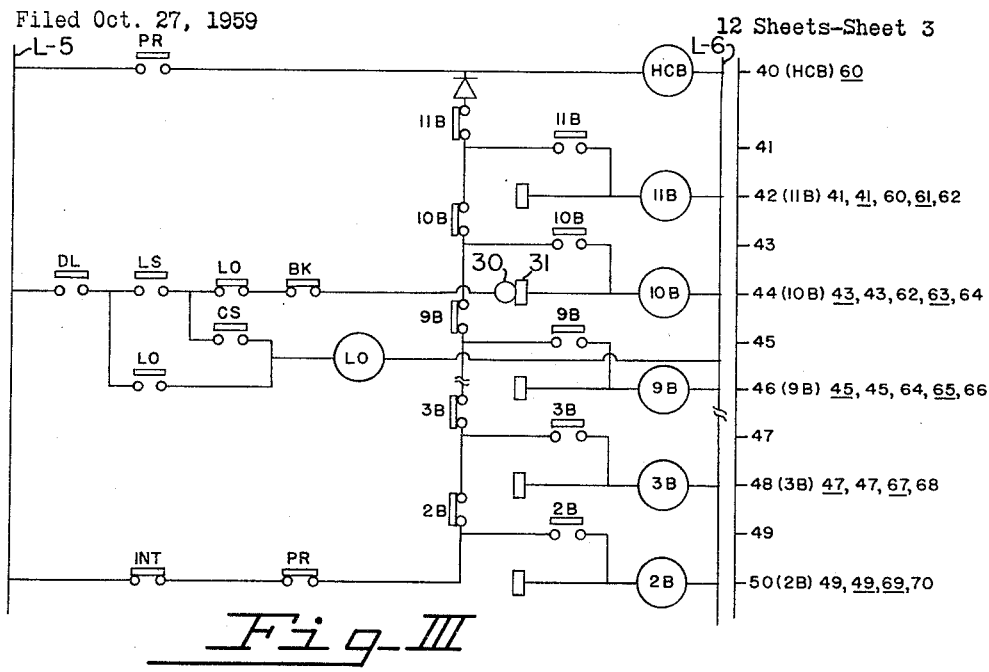
Fig. III
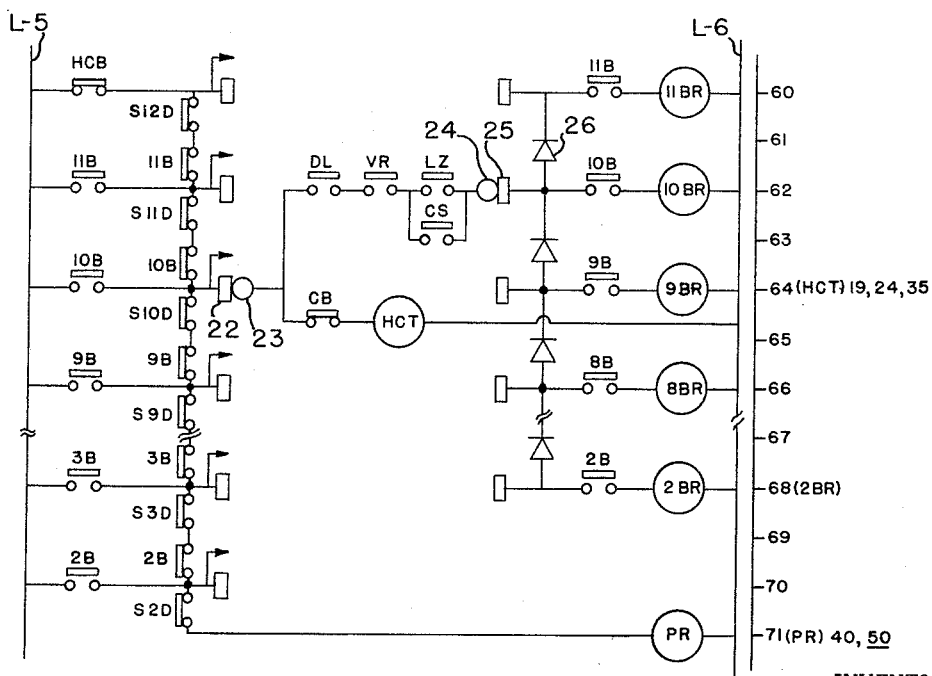
Fig. IV
INVENTOR.
JOHN R. DINNING
BY
Marshall, Marshall & Yeasting
ATTORNEYS

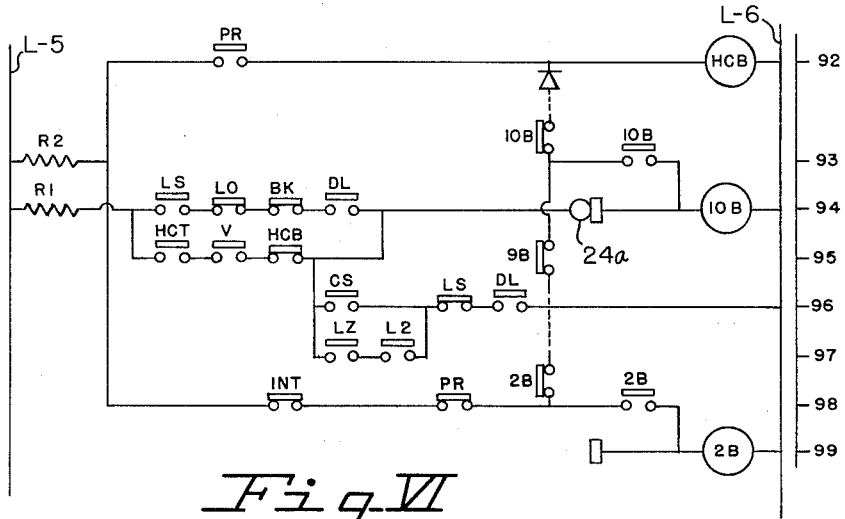
Fig. VI
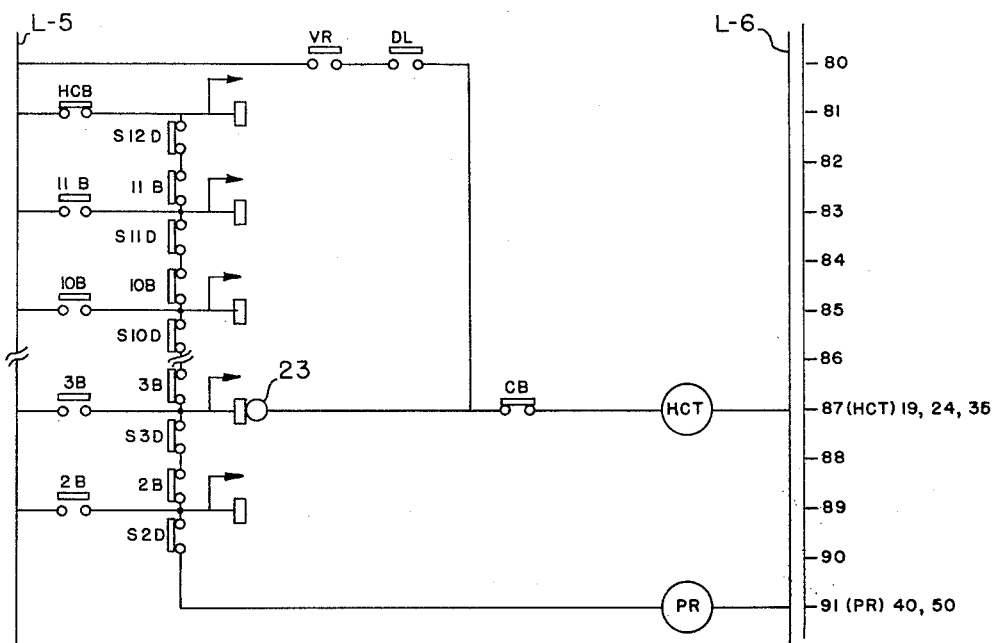
Fig. V
INVENTOR.
JOHN R. DINNING
BY
Marshall, Marshall & Yeasting
ATTORNEYS

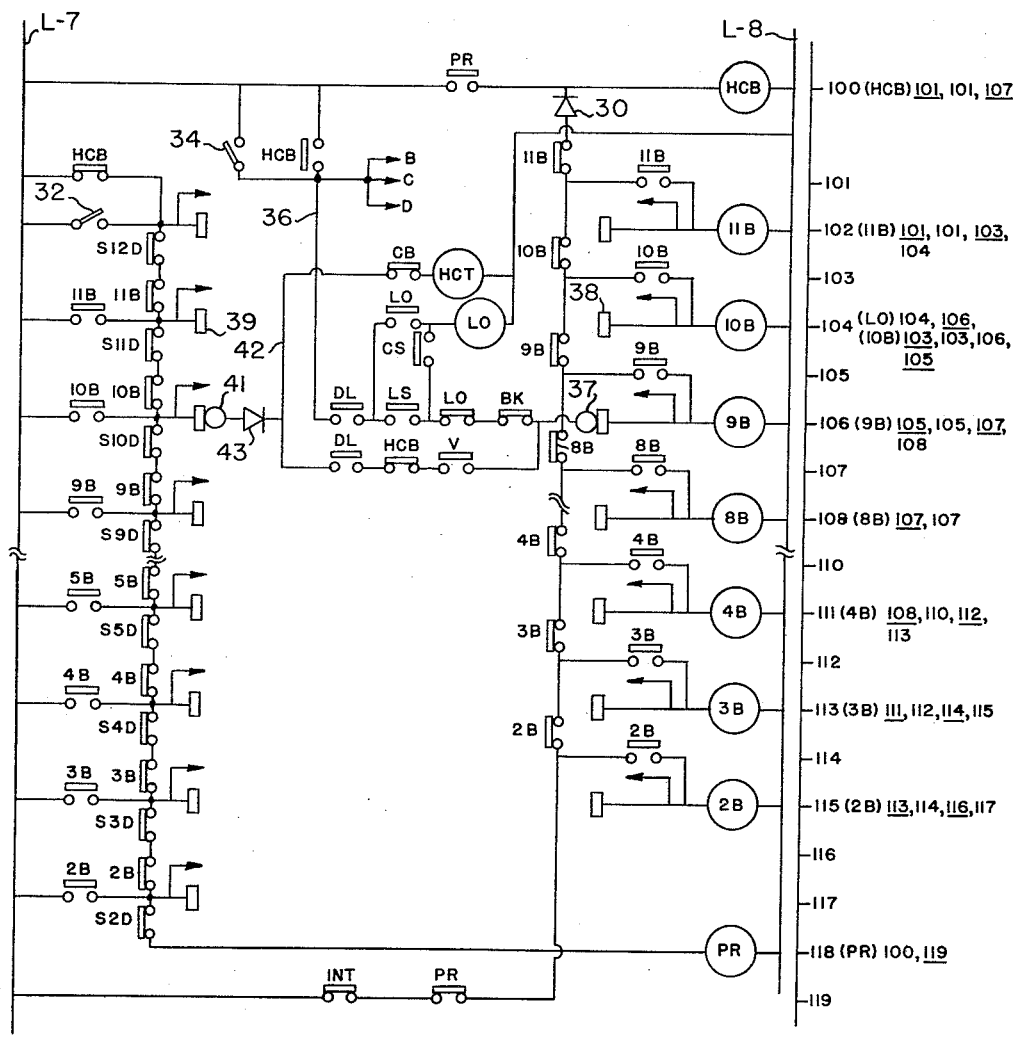
Fig. VII

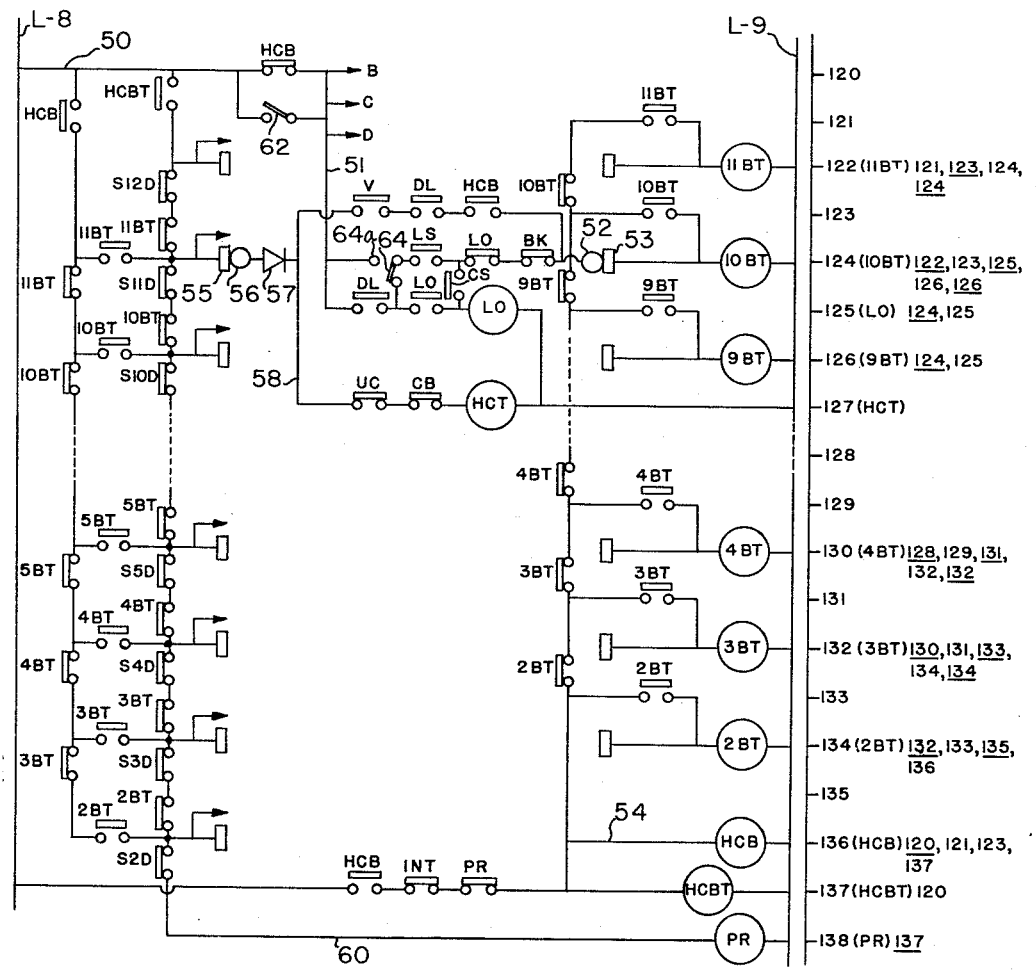
Fig. VIII

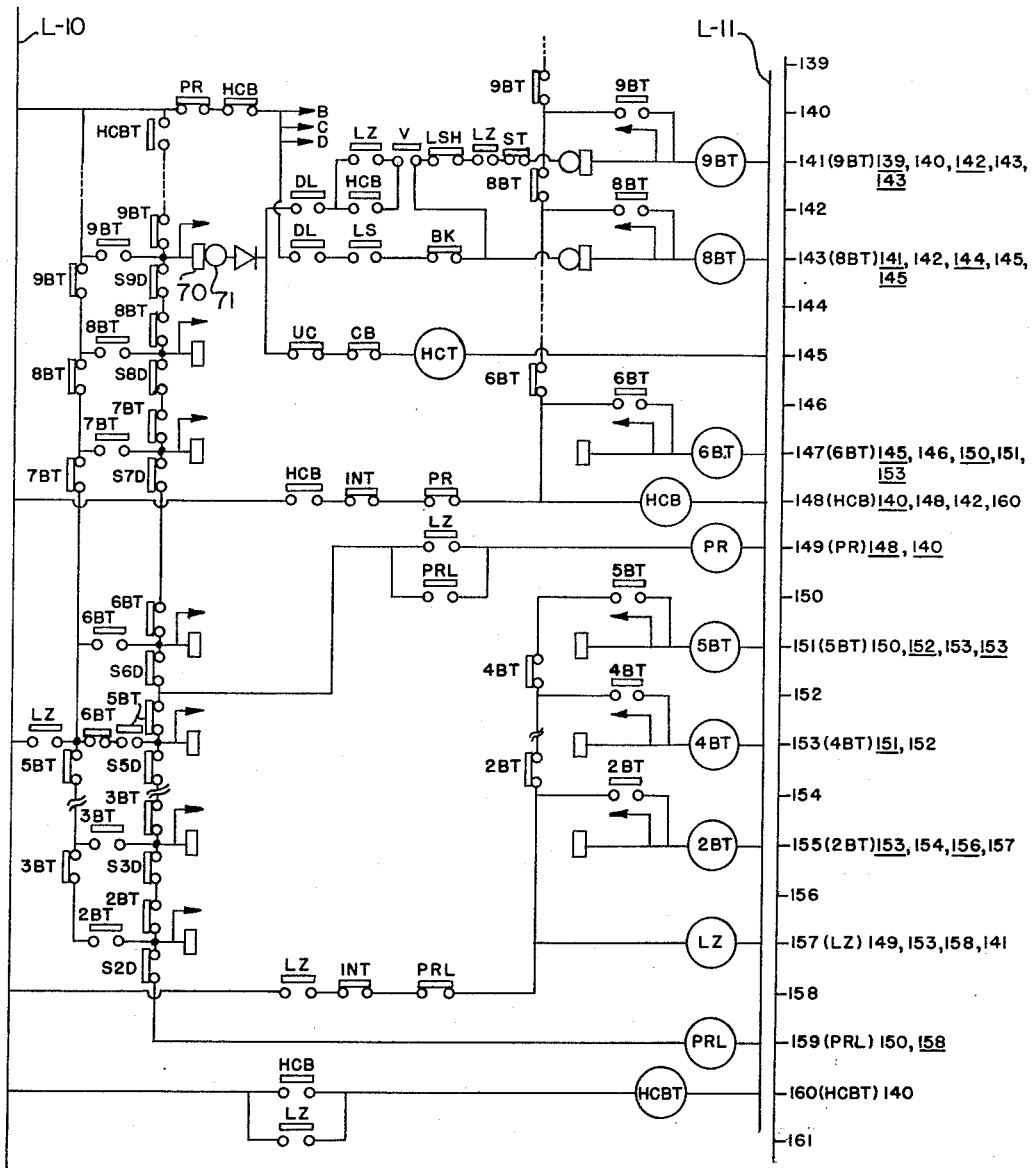
Fig. IX

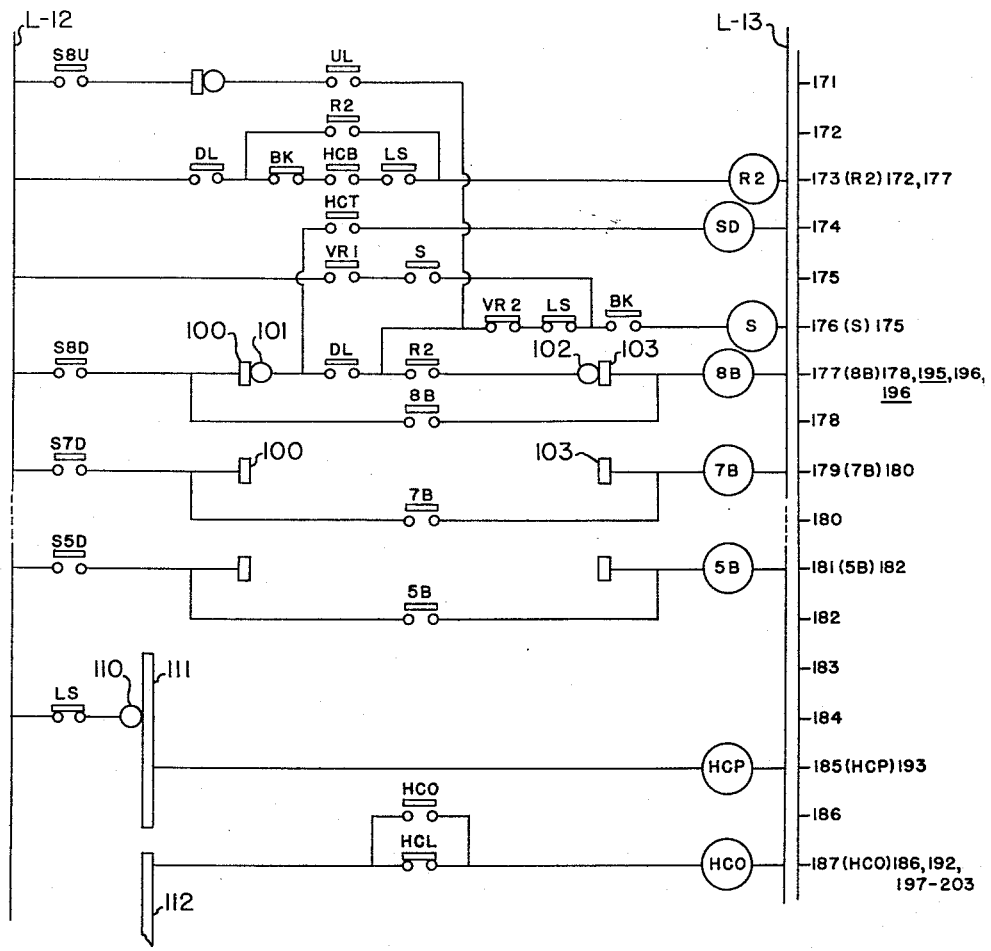
Fig X

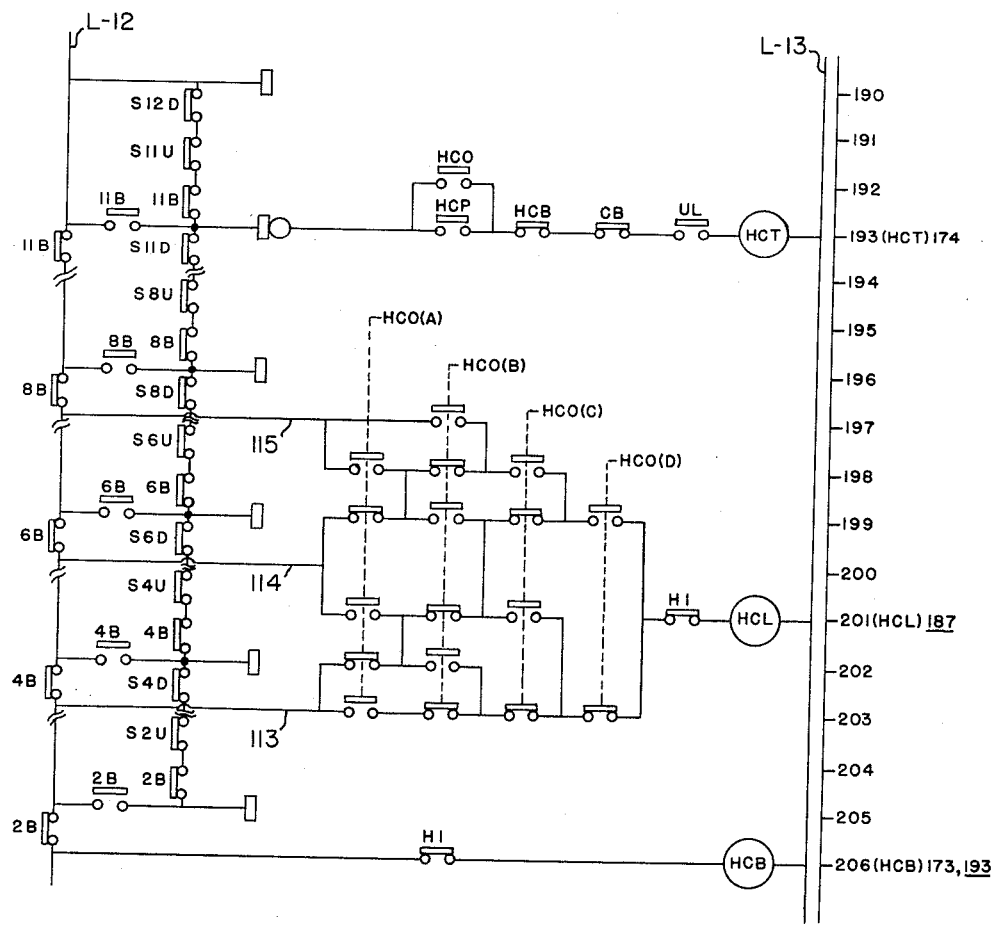
Fig. XI

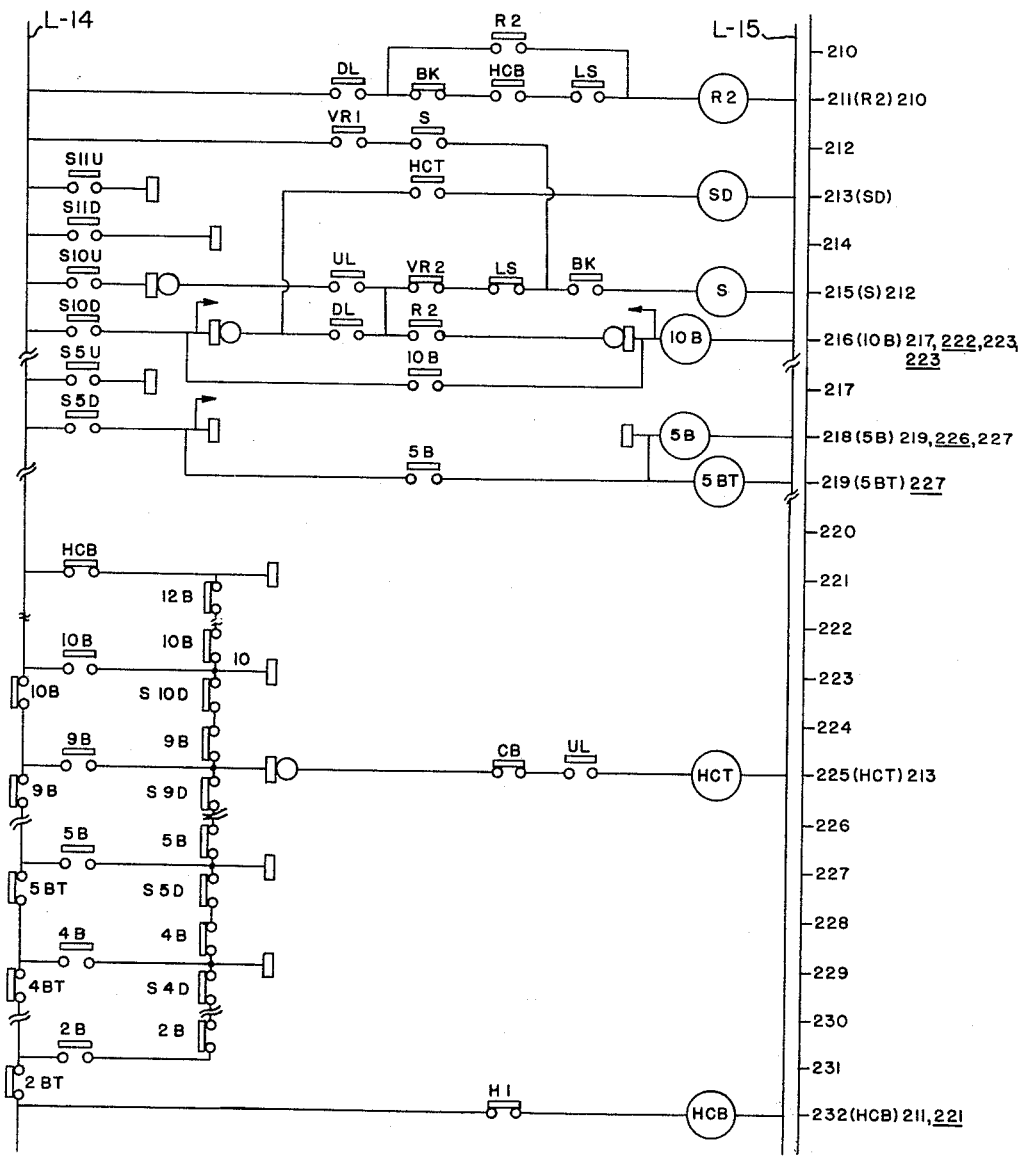
Fig. XII

3,051,268
ELEVATOR CONTROL SYSTEM
John R. Dinning, Toledo, Ohio, assignor to Toledo Scale Corporation, Toledo, Ohio, a corporation of Ohio
Filed Oct. 27, 1959, Ser. No. 848,950
28 Claims. (Cl. 187—29)

This invention relates to elevator control circuits and in particular to circuits that are effective during heavy down traffic conditions for equalizing the time intervals that intending passengers are required to wait for service.

Most elevator systems are, during certain periods of each day, subjected to heavy demands of traffic from a plurality of floors to a given or particular floor that is ordinarily but not necessarily below the plurality of floors. In an ordinary office building this heavy demand of traffic is commonly called the "down peak" traffic and occurs when the building occupants are leaving the building at lunch time or at the close of the business day. In a hotel this condition may occur any time during the day and is expected in the morning hours when the hotel guests are leaving the hotel. It may also occur at other times during the day depending upon the usage of the hotel.

In the ordinary elevator system difficulty is often experienced during these periods of heavy down traffic in that the cars become fully loaded at the upper floors of the building and then bypass intermediate and lower floors without stopping for intending passengers waiting at such intermediate and lower floors. It often happens that all of the cars on successive trips become fully loaded on their downward trips before reaching a certain level and any intending passengers below such level must wait until all of the intending passengers on higher floors are served before a car becomes available to answer their call. Various schemes have been proposed to overcome this problem. Usually these schemes involve timing the duration of the registered hall calls and providing special service to those calls that have been registered for more than a given length of time. The usual difficulty with this approach to the problem is that cars assigned to special service usually operate at less than maximum efficiency thus actually degrading or decreasing the efficiency of the elevator system as a whole or enough high and intermediate level floors become long wait calls to still monopolize the elevator service.

The principal object of this invention is to provide control circuits or control means for a group of elevators for so regulating the movement of the cars that a maximum number of passengers may be served in a given time without requiring any of the passengers to wait an unduly long length of time.

Another object of the invention is to provide a system of control which immediately recognizes the existence of a heavy down traffic condition, i.e. traffic to a particular floor, and responds to that condition to both minimize the travel of the elevators and equalize the length of time that intending passengers at various floors are required to wait.

Another object of the invention is to provide a control mechanism for a plurality of elevator cars which prevents the cars from successively serving certain floors of a building while other floors are totally deprived of service.

These and more specific objects and advantages may be obtained from control circuits constructed and operated according to the invention.

According to the invention, control circuit means are provided which, in response to a predetermined demand such as a down traveling car acquiring a full load at a floor, establishes a high call reverse ceiling or zone limit which, by design, may be at the next lower floor, the next lower floor having a down call registered, or at the highest down call then registered, so that the next available up traveling car reverses at the highest call at or below such ceiling. The high call reverse ceiling or zone limit is either canceled when the highest call at or below such ceiling is answered or, preferably, is shifted to the next lower floor or to the next lower floor at which a down call is registered and, when the ceiling is at a lower floor, is suspended as long as there is a car in service below the ceiling.

Several examples of elevator control circuits for providing the improved service according to the invention are illustrated in the accompanying drawings.

In the drawings:

FIG. I is a schematic diagram illustrating in general the type of elevator system to which the invention may be applied.

FIG. II and IIa are schematic wiring diagrams, in simplified form, illustrating hall call registering circuits, and circuits for causing a car to respond to hall calls, including circuits for reversing a car upon receipt of a signal that it has reached the farthest call to which it should respond.

FIG. III is a schematic diagram showing circuit means for energizing the high call reverse ceiling relay for the floor below that at which a down traveling car acquires a full load.

FIG. IV is a schematic wiring diagram showing circuit means for causing an up traveling car to respond to the highest call at or below a high call reverse ceiling put into effect by the circuits shown in FIG. III and for canceling such ceiling when the highest call at or beneath such ceiling is answered.

FIG. V is a simplified schematic diagram illustrating a modified circuit for resetting or canceling the ceiling indication whenever the lowest down call is answered.

FIG. VI shows an alternative circuit for canceling the high call reverse ceiling by a car answering the highest call below the ceiling.

FIG. VII is a schematic diagram of another circuit arranged to establish a high call reverse ceiling at a floor at which an elevator car acquires a full load and, as the highest call at or below the ceiling is answered, to shift such ceiling to the floor next below such last answered call.

FIG. VIII is a schematic wiring diagram similar to FIG. VII showing an arrangement for temporarily suspending operation of the ceiling when the ceiling is at a lower floor.

FIG. IX is a fragmentary schematic diagram illustrating means for establishing a plurality of high call reverse ceilings.

FIG. X is a schematic wiring diagram of the high call reverse circuit in which the first car to acquire a full load in the absence of any high call reverse ceiling establishes potential ceilings at each down call that it bypasses.

FIG. XI is a schematic wiring diagram of a high call reverse circuit cooperating with the circuit shown in FIG. X and means for limiting the number of cars restricted to calls beneath the then registered ceiling.

FIG. XII is a fragmentary schematic diagram illustrating a circuit generally similar to that shown in FIGS. X and XI for varying the number of cars retained beneath the registered ceiling according to the time required to answer each of the calls below the ceiling.

FIG. XIII is a fragmentary schematic diagram illustrating still another way of establishing a plurality of potential high call reverse ceilings when a down traveling car acquires a full load and indicating the positions of the cars available to serve each of several zones of floors.

FIG. XIV is a schematic diagram illustrating one way of dividing the system into a plurality of zones and assigning the cars to the zones in accordance with the hall calls registered at the beginning of a cycle of operation of the system and the absence of cars from the respective zones.

These specific figures and the accompanying description are intended merely to illustrate the invention and not to impose limitations on its scope.

One of the difficult problems in the design of supervisory equipment for elevator systems is to provide a pattern or method of operation of the system that will equitably divide the service provided by the cars among the intending passengers waiting at a number of floors. This is the situation that occurs during the down peak traffic period in an ordinary office building. The usual difficulty in handling this type of traffic is that the cars, even though reversing at the highest or farthest call, become loaded to capacity at the upper floors of the building and, therefore, bypass intermediate and lower floors. Traffic is often heavy enough that all of the cars on successive trips become fully loaded before reaching the lower intermediate or lower floors of the building. Attempts to correct this situation by reversing available up traveling cars at low or intermediate floors where a signal has been registered for more than a given length of time often result in the cars returning to the lobby floor with small loads since the number of passengers waiting at the lower floors may be few in number.

The control circuits according to the invention solve this problem by providing that, in general, no floor is served several times in succession while another floor goes without service. In one embodiment of the invention the control causes a group of elevator cars to simulate a multi car system one car of which has infinite capacity in that when a first car traveling down from the top or remote part of the building acquires a full load it establishes a high call reverse ceiling or zone limit at the next lower floor or floor nearer the particular floor at which the next uptraveling car stops and reverses. The second car thus acts as a continuation of the first car in serving passengers at next lower floors. If the second car should also become fully loaded before reaching the lobby floor it in turn establishes a high call reverse ceiling or signal point to reverse the next up traveling car so that it in effect continues the operation of the second car in answering the calls for service at lower floors. In this form of control only the first up traveling car to reach such a high call reverse ceiling or zone limit is stopped at such ceiling or limit and reversed. That car, when leaving after serving the highest call at or below the ceiling cancels that signal and thereafter, until it becomes fully loaded, other up traveling cars are allowed to proceed to higher calls then registered in the system.

In another embodiment of the invention the control circuits are arranged in a manner such that when a first down traveling car that started from the top or remote part of the building becomes fully loaded it establishes a high call reverse ceiling or zone limit at the next lower floor. The next car to reach the highest down call at or below such ceiling or limit then answers such call and in doing so establishes a high call reverse ceiling or limit at the next lower floor. This arrangement keeps all of the cars below the high call reverse ceiling or zone limit except those cars which may be skipped as the ceiling is shifted downwardly from one floor to another.

This circuit provides very quick service for the lower floors of the building since all of the cars are utilized in answering these calls. This has the disadvantage however, that some of the cars, when the high call reverse ceiling or zone limit gets down to one of the lower floors, return to the lobby with less than full loads. Since it is undesirable to keep all of the cars operating below a low floor high call reverse ceiling or zone limit the circuit may be modified so that as a car answers the highest call at or below such a low zone ceiling it sets up a ceiling for the next lower floor but suspends operation of the ceiling circuit for a limited time or until the car leaves the floor after taking on the passengers. During such limited time the system is open for the cars to proceed uninterruptedly to the highest actual call.

In a third embodiment of the invention the circuit is arranged in such a manner that a potential high call reverse ceiling or zone limit is established at each down call that is bypassed by a fully loaded car. As soon as a potential high call reverse ceiling signal is established other down traveling cars are prevented from establishing such ceilings until all of the calls bypassed by the first car have been answered. When a number of such potential high call reverse ceiling or zone limit signals have been established the highest serves as an actual zone limit or ceiling and the available up traveling cars reverse at the highest call at or below such ceiling. As the call is answered that ceiling and the hall call signal are canceled and the next lower potential ceiling becomes the actual ceiling. In this circuit to prevent the accumulation of the cars at the lower floors, the effect of the high call reverse ceiling or zone limit is suspended for a brief interval of time after the highest call at or below such ceiling is answered. At the end of this time interval the ceiling is re-established. While making the time interval approximately equal in length to the time required to answer a call and proceed to the next call a single car traveling downwardly and answering calls in the low range or in the low zone of floors may keep the ceiling signals continuously suspended. In the event that the car is delayed at one of the floors or becomes fully loaded the high call reverse ceiling is re-established at the highest remaining unanswered call.

In lieu of suspending the operation of the high call reverse ceiling circuit for a brief interval of time, a car selection or assignment circuit may be employed which as long as a car is answering calls in the low zone excludes the other cars from high call reversing in such low zone.

In a fourth embodiment of the invention the control circuits are arranged in a manner such that when a down traveling car becomes fully loaded it sets up potential high call reverse ceilings at all of the down hall calls then registered. Each car of the entire bank of cars then proceeds to high call reverse at the highest remaining one of such calls until those calls have all been answered. This fourth embodiment of the invention differs from the third in that the potential high call reverse ceilings or zone limits are established at all the calls then registered rather than at the calls bypassed by the first car to become fully loaded.

The last embodiment generally provides that no floor may be served successively while a call remains unanswered at another floor. The other embodiments of the invention provide this feature to a more or less degree in that some of the other embodiments permit some cars to travel to the upper floors with a possibility of serving such floors twice before a car serving the lower floors has answered all of such lower calls. While it is desirable to rigidly enforce the condition that no floor be served twice while a call remains unanswered at another floor it is equally desirable to prevent the cars from returning to the lobby partially loaded during heavy down traffic conditions. In order to achieve a compromise between these conflicting objectives the various circuits are arranged so that the upward travel of available cars is limited by the high call reverse ceilings until such ceiling has been shifted downwardly to a point where one or two cars may answer the remaining calls without becoming fully loaded at which time the remaining cars are permitted to travel to the upper floors of the building.

An elevator system to which the invention may be applied may comprise a plurality of elevator cars 20 that serve a plurality of floors in response to signals set up by actuation of hall call buttons 21 or car calls set up by operation of destination buttons in each of the cars. The car buttons are not shown in the drawings. The cars 20 are suspended by cables 22 which pass over sheaves or pulleys 23 and are connected to counterweights 24. The sheaves 23 are mounted on armature shafts 25 of elevator drive motors 26. The armature shafts 25 are also mechanically connected to floor selector machines 27 which in cooperation with the hall call registering buttons 21 and supervisory control circuits, not shown, control the operation of the elevator motors 26 so as to move the cars from floor to floor as may be required.

In the following description of the circuits for distributing or controlling the response of the elevator cars during down peak operations only the relays and switches associated with such operations are described. It is to be understood that an actual elevator system will include many more control relays for other functions.

For convenience in following the description each of the wiring drawings is provided with a key along its right margin, this key specifying the line numbers of the drawings, the relay operating coil or coils that may be included in such line, and the line location of the contacts operated by such coil. In the drawings the contacts are all shown in the condition assumed when the operating coils are deenergized. Those contacts that are closed when the operating coil is deenergized, commonly known as back contacts, are identified in the key by underscoring the line number in which such contacts appear. To correlate the operating coils with their respective contacts the same reference characters are applied to each.

In the several embodiments of the invention illustrated in the accompanying drawings the relays having corresponding functions are given the same reference characters.

In any elevator control system some of the control relays and switches are common to all of the cars of the system while other relays and switches are duplicated for each car. In the following description those relays and contacts which are individual to a car and duplicated for each car include the following:

| | |
|---|---|
| BK | Brake (energized when brake is released). |
| BP | Bypass. |
| CB | Car call above. |
| CS | Car start. |
| DF | Down field. |
| DL | Down directional preference. |
| HCO | High call reverse assignment. |
| HCP | High call reverse assignment. |
| HCR | High call reverse. |
| HCT | High call reverse timer. |
| HD-2 | Low zone assignment. |
| HD-5 | Intermediate zone assignment. |
| HD-8 | High zone assignment. |
| L | Leveling. |
| LBP | Load bypass. |
| LO | Lockout. |
| LS | Load switch. |
| MG | Car at lobby. |
| RB | Car button reset. |
| RL | Directional latch. |
| R-2 | High call reverse ceiling selection. |
| S | Hall call stop. |
| SC | Car call stop. |
| SD | Highest hall call stop. |
| UF | Up field. |
| UL | Up directional preference. |
| V | Elevator stopping sequence. |
| VR | Elevator stopping sequence. |
| VR1 | Elevator stopping sequence. |
| VR2 | Elevator stopping sequence. |

Those relays and contacts that are in the control circuits common to all of the elevators include the following:

| | |
|---|---|
| INT | Intermittent service relay. |
| HCB | Hall calls bypassed. |
| HCBT | Hall calls bypassed timing. |
| HCL | High call reverse assignment. |
| HC-2 | Low zone bypassed calls. |
| HC-5 | Intermediate zone bypassed calls. |
| HE-8 | High zone calls. |
| HX-2 | Low zone lockout. |
| HX-5 | Intermediate zone lockout. |
| H1 | Up peak program. |
| PR | Priority reset. |
| S#D | Down hall call. |
| S#U | Up hall call. |
| 2-B, etc. | High call reverse ceiling. |
| 2-BR, etc. | High call reverse ceiling reset coil. |
| 2-BT, etc. | High call reverse ceiling timed release. |

Where it is necessary to identify a relay or contacts as associated with a particular car the symbols (A), (B), (C) and (D) are appended to the reference characters those with the (A) referring to car A and those with the (B) to car B, etc.

Circuits for FIGS. II and IIa registering hall calls and causing the cars to respond to such calls including reversal at a high call are illustrated in FIGS. II and IIa. Referring to FIG. II typical hall call registering relays are illustrated in lines 10 to 17 inclusive. In an installation each intermediate floor is provided with two of these relays and each terminal floor with one such relay. These relays marked S1U through S12D are latch relays which may be either electrically, magnetically or mechanically latched. Each is actuated to its "on" condition when the associated push buttons 1U to 12D (electrical switches operated by the push buttons 21 of FIG. I) is closed so that current may flow from a lead L1 through an operate coil of the relay and thence through the now closed contacts of the push button to a lead 10 connected to the return line L2. When a relay is so energized it closes its contacts in lines 20 to 28 so as to connect the power lead L1 to corresponding selector machine contact points 11.

An offset pointed arrow connected to a lead connected to a selector machine contact indicates a connection to the corresponding contact of each of the other floor selector machines.

Each of the selector machines has a carriage including a plurality of brushes that cooperate with the selector machine contacts. The stopping circuits are arranged so that the first car that approaches a floor at which a call is registered in a direction to answer such call automatically stops at that floor. These circuits are illustrated in lines 21 and 22 and include an up direction stopping brush 13 and down direction brush 14 that are connected respectively through up field relay contacts UF, line 21, or down field contacts DF shown in line 22 and thence through a circuit (line 22) comprising normally closed stopping sequence relay contacts VR2, normally opened but now closed bypass contacts BP, the coil of the hall call stopping relay S and normally open brake relay contacts BK to the return lead L-2. The up field or down field relay contacts UF or DF respectively are closed as long as the car is traveling in that particular direction. The contacts VR2 of the stopping sequence relay are closed as long as the car is not stopping. The bypass relay contacts are closed as long as the car is operating in normal condition and accepting calls. These contacts are opened as soon as the car becomes loaded to bypass hall calls. The brake relay contacts BK are closed as long as the brake is released so that the car may be moved under control of the elevator drive motor system. As soon as the stopping relay S is energized through this circuit it closes its contacts S in line 18 which in cooperation with normally open stopping sequence relay contacts VR1 complete a sealing circuit from the power lead L1 through the lead in line 18 to the hall call stop relay S. This circuit maintains stopping relay S energized as the stopping sequence relay VR2 opens its contacts in line 22. These sequence relay contacts VR2 in line 22 are included to prevent feedback from the now energized S relay coil to the selector machine contacts 11 or 12 which would thus energize the corresponding contacts on the other floor selector machines so that any other car then approaching such floor would also stop.

Part of the sequence relay chain employed in the stopping of the car includes contacts VR in line 13 which in cooperation with UF or DF contacts in lines 13 and 14 and brushes 15 and 16 cooperating with floor selector machine segments 17 or 18 complete circuits to the rest coils of the hall call stopping relays S1U through S12D. Ordinarily only a few hundredths of a second elapses from the time that current first flows through the hall call stopping relay S in line 22 until the hall call at that floor is canceled to prevent other cars from stopping at that floor.

FIG. II also illustrates the energizing circuit for the highest hall call stopping relay SD appearing in line 24. This relay is energized whenever the car approaches a floor at which the highest down call is registered if the highest call timing relay HCT is also energized. The highest call timing relay HCT, which cooperates with the circuits to be described for controlling the operation of elevator cars during down peak traffic conditions, is energized whenever the elevator car is at or above the highest hall call. When this relay is energized it closes its contacts HCT in lines 19, 24 and 35, those contacts in line 35 cooperating with contacts of the highest hall call relay SD to energize the high call reverse relay HCR. It may be noted that the circuits for the high call reverse relay HCR are completed only when the car is approaching an actual call whether it be a car call or a high floor call. In the usual arrangements the high call timing relay HCT is energized only when the car is at or above both the highest car call and the highest hall call thus indicating that there are no higher calls to be answered.

When the high call reverse relay HCR is energized it closes its contacts in line 32 to complete a circuit from lead L3 through a coil of a car button reset relay RB, a directional latch relay coil RL, normally closed contacts of the down memory relay DL, the now closed high call reverse contacts HCR and normally closed MG contacts which are closed as long as the car is not at the lower floor. The directional latch relay RL thereupon releases so as to close its normally closed contacts in line 34 to energize the down direction memory relay DL and deenergize the corresponding up direction relay UL. Energization of the down memory relay DL closes its contacts in line 19 which in cooperation with the now closed high call timing relay contacts HCT complete a circuit to the hall call stop relay S in line 22. The car thereupon stops at that floor with its controls and signals set for down travel. It may be noted in these circuits that if a car is traveling upward toward a higher call and such call is answered by another car so that there is then no higher call to be answered the up traveling car, even though it has a high call reverse signal through its HCT relay, does not stop until it either reaches a subsequently registered call or the top of the building.

The directional latch relay RL is also operated through selector machine contacts 19 and 20 and brush 21 when the car reaches the extremes of travel so that it approaches the terminal floors with the directional latch relay reset to travel away from that floor. Since the direction indicating lanterns or other signals are subject to the control of the directional latch relay RL this means that the directional signals will indicate the next movement of the car even though the car may still actually be moving in the first direction.

FIGS. III AND IV

A first circuit for automatically zoning a group of elevator cars in response to bypassed calls is illustrated in FIGS. III and IV. When an elevator system is operating under the control of this circuit a high call reverse ceiling or zone limit is established at the floor below the floor at which a down traveling car or a car approaching a particular floor acquires a full load.

The term "high call reverse ceiling" is used to denote the top of a zone of floors usually the lower floors to which operation of the system of elevators is restricted until such ceiling or zone limit is canceled. When a high call reverse ceiling is in operation a car will go above such ceiling in response to car calls registered for higher floors and once above the ceiling will answer calls in the normal manner. Except for this one condition all up traveling cars are reversed at the highest call at or below the ceiling as long as the ceiling is in effect.

In this particular control circuit a high call reverse ceiling is canceled either immediately that the highest call at or below such ceiling is answered or, if the ceiling is above a selected floor such as the fifth floor, is canceled as soon as the answering car leaves the floor after answering the signal. This difference in releasing time or canceling time tends to restrict more cars to the lower portion of the building when the ceiling is at a higher floor and to hold only one car below the ceiling when the ceiling is at a lower floor.

Referring specifically to the wiring diagrams illustrated in FIGS. III and IV a family of ceiling relays 2B through 11B serving as circuit dividing means or zone limiting means are provided one for each of the intermediate floors of a 12 floor building. These relays in this embodiment are preferably of a double coil variety having an energizing coil and a canceling or release coil. The energizing coils are illustrated in FIG. III while the canceling coils are illustrated in FIG. IV. The canceling coils are identified by the letter R appended to each of the reference numerals. The ceiling relays 2B through 11B, when energized, establish a high call reverse ceiling for the corresponding floor. The ceiling relay 10B for the tenth floor may be energized for example when a car is standing at the eleventh floor and acquires a full load. When this occurs a circuit is completed from a supply line L5 through now closed down direction memory relay contacts DL, load switch contacts LS, normally closed contacts LO of the lockout relay, normally closed brake relay contacts BK to a selector machine brush 30 and selector machine contact 31 connected directly to an operating coil 10B of the tenth floor ceiling relay. The other side of this coil is connected to a return lead L6. When this relay is energized through this circuit it closes its contacts 10B in line 43 to complete a sealing circuit that may be traced from the lead L5 through now closed intermittent service relay contacts shown in line 50, normally closed priority reset relay contacts PR and thence through a chain of normally closed contacts of all of the ceiling relays 2B through 9B. This tenth floor relay 10B also opens its contacts 10B in line 43 to deenergize any ceiling relays above the tenth floor including a bypassed hall call relay HCB shown in line 40.

When this loaded car prepares to leave the eleventh floor its car start relay contacts CS close in line 45 so that current can flow through the now closed load switch LS through an operating coil LO of a lockout relay. This relay thereupon seals itself in through a circuit that includes the down direction memory relay contacts DL, lockout relay contacts LO in line 46 so that this relay remains energized until the car reverses. This relay is included solely to prevent a loaded down traveling car, having once established a high call reverse ceiling, from establishing a lower high call reverse ceiling when stopping at a lower floor in response to a car call. As long as the load switch on a car is operated to its closed condition it, through circuits not shown, opens the bypass relay contacts in the stopping circuit so the car will not respond to hall calls.

Referring now to the circuit shown in FIG. IV, which cooperates with that shown in FIG. III, the energization of the tenth floor high call reverse ceiling relay 10B divides a high call reverse signal circuit along the left side of the diagram into two segments and energizes the upper end of the lower segment by completing a circuit from a supply lead L5 through now closed contacts 10B in line 64 to energize the lower segment of the circuit comprising a chain of normally closed down stopping relay contacts S10D, etc. and normally closed high call reverse ceiling relay contacts 9B, 8B, etc. The opening of normally closed ceiling relay contacts 10B, just above line 64, isolates the upper segment of the high call reverse circuit.

When another car reaches the highest call at or below the high call reverse ceiling now established at the tenth floor a circuit is completed from the tenth floor selector machine contact 22 through the selector machine brush 23, normally closed car call above contacts CB and the operating coil HCT of a high call reverse timing relay. This relay, if the car is set for upward travel, conditions the circuits to stop the car at that high call and reverses it for downward travel. If the car is traveling down from a higher floor this relay is without effect and the car makes a normal stop at the high call at or below the high call reverse ceiling. As the car answers this call in response to the signal it completes a circuit from the now energized brush 23 through the circuit shown in line 62 which includes down direction memory relay contacts DL, stopping sequence relay contacts VR and either low zone contacts which close at the fifth floor or car starting relay contacts CS thence to a selector machine brush 24 and contact 25 to energize the tenth floor point of a series of rectifiers 26. From the tenth floor point current flows through contacts 10B to energize a release coil 10BR of the tenth floor high call reverse ceiling relay. The series of rectifiers 26 are included to ensure cancellation of the high call reverse ceiling in the event the highest call was at a floor below the ceiling and there was no call at the ceiling floor itself. For example, the car might stop at the eighth or ninth floor when the tenth floor was actually the high call reverse ceiling and a reset circuit by way of one or more of the rectifiers 26 is required to energize the coil of the operated relay.

Referring back to FIG. III, as long as there is no high call reverse ceiling relay energized, the series chain of normally closed ceiling relay contacts is completed to energize the high call bypass relay HCB in line 40. When one of the relays is energized by a car becoming loaded it breaks the circuit to the high call bypass relay HCB so that it closes its contacts in line 60 thereby energizing the high call reverse circuit contacts shown in FIG. IV. When the high call reverse ceiling relay is deenergized to cancel the ceiling the system reverts to normal operation with the cars making full trips. This continues until another car becomes fully loaded at which time it energizes the high call reverse ceiling relay for the floor below its then occupied position. Ordinarily the next car to become so loaded is the car that reversed and canceled a previous ceiling in response to the previous high call below the ceiling. If this car becomes fully loaded before answering all of the down calls at or beneath it, it reestablishes a high call reverse ceiling for the floor below. If there are calls at or below such floor the normal sequence as just described continues when the next up traveling car stops at the highest call at or below such floor. In the event that there are no calls at or below that floor the energization of the high call reverse ceiling relay for that floor establishes a circuit through the high call reverse circuit of normally closed contacts including contacts of the down signal relay S2D for the second floor and thence through a lead in line 71 to energize a priority reset relay PR. This relay, when energized, opens its contacts in line 50 to immediately break the holding or sealing circuit to the then energized high call reverse ceiling relay. The priority reset relay PR immediately closes contacts in line 40 to energize the bypass hall call relay HCB which in turn opens its contacts in line 60 to restore normal operation rather than high call reverse operation for the bank of elevators. As soon as the bypassed hall call relay HCB operates to open its contacts in line 60, the priority reset relay PR is deenergized leaving the bypassed hall call relay energized by way of the chain of series contacts shown in FIG. III. The system is now returned to a condition in which it is ready to respond to another loaded car. In the absence of such loading the system continues to operate in normal operation with the cars traveling to the terminals and being regularly dispatched.

FIG. V

A slightly modified arrangement of the resetting circuit which may be used either in conjunction with or in place of the resetting circuit shown in FIG. IV is shown schematically in FIG. V. In this modification the high call reverse brush 23 is connected to the lead L5 by normally open down direction memory relay contacts DL and stopping sequence relay contacts VR in line 80 so as to energize the high call reverse series of contacts at a point corresponding to the floor at which the car is stopping. If there are no calls below this floor this circuit through the chain of normally closed contacts of the ceiling and down hall call relays energizes a priority reset relay PR so that it then cancels any high call reverse ceiling. When this reset circuit is used in place of that shown in FIG. IV it suffers from the hazard that if the high call reverse ceiling be at a high floor it is quite possible that the group of elevator cars could operate for a substantial period of time beneath such high call reverse ceiling without answering the lowest registered call. If this occurs there is no way of serving the top floors of the building above the high call reverse ceiling point until the intermediate and lower floors had all been cleared of traffic. This circuit may be used in locations where this hazard is not present, i.e., where there is no substantial amount of lower intermediate floor traffic in comparison with the traffic from the higher floors. This circuit may also be used in conjunction with that of FIG. IV by adding this particular connection to the circuit shown in FIG. IV. This circuit would then serve as a corrective measure to correct any malfunctioning of the other reset circuit.

FIG. VI

In the circuit shown in FIG. IV which is employed to cancel any previously energized high call reverse ceiling relays the higher ceiling is reset as soon as the car leaves that particular floor. Another method of accomplishing substantially this same result is shown in FIG. VI. In this circuit the reset coils of the high call reverse ceiling relays are eliminated and instead the relays are energized through circuits including resistors and are deenergized by shorting or shunting the operating coils to reduce the current flow through the coil to a value less than that required to keep the relay energized. In this arrangement a ceiling relay such as the relay 10B in line 94 is energized when a down traveling car acquires a full load while standing at the eleventh floor. The energizing circuit may be traced from a lead L5, through resistor R1 and thence through the now closed load switch LS of the car, normally closed lockout relay contacts LO, normally closed brake relay contacts BK, and down direction memory relay contacts DL. Once this relay is energized it, through circuits similar to those illustrated in FIG. IV, establishes a high call reverse ceiling for the tenth floor. This relay is held closed by current flow from the supply lead L5 through resistor R2 and normally closed contacts of each of the ceiling relays for floors below the tenth floor.

When the highest call at or below the tenth floor is answered by another car it completes a circuit by way of its high call reverse timer relay contacts HCT, shown in line 95, normally open stopping sequence relay contacts V and normally closed bypassed hall call relay contacts HCB to energize the high call reverse ceiling relay for the next lower floor. For this portion of the circuit it is assumed that the previous high call reverse ceiling was established by a car at the eleventh floor when the next car answers a call at the tenth. This shifts the high call reverse ceiling down to the floor below the just answered highest call.

The high call reverse ceiling is in effect for that floor until the car leaving the next higher floor starts without having acquired a full load. If the car leaves the floor above that at which the ceiling is established without acquiring a full load it completes a circuit from its brush 24a through its car start switch CS, normally closed load switch contacts LS, and down direction memory relay contacts DL in line 96 so as to shunt the operating coil of the then energized high call reverse ceiling relay. This relay thereupon releases and the bypassed hall call relay HCB picks up thus leaving the system without a high call reverse ceiling. If the car leaves wtih a full load its load switch contacts LS in line 96 are open so that the relay is not deenergized and the high call reverse ceiling therefore remains in effect. To avoid trapping cars unnecessarily when a ceiling is established at a low floor, additional contacts of a low zone relay LZ and a leveling relay L2 are shown in line 97 in parallel with the car start switch contacts so as to complete the shunting circuit a moment after the relay was energized by prior closure of the stopping relay contacts V in line 95. The low zone relay LZ contacts in line 97 are arranged to be closed as long as the car is below the fifth floor for example. Therefore when the car answers the highest call at or below the high call reverse ceiling at or below the fifth floor the high call reverse ceiling is immediately canceled for all cars. However, should the car acquire a full load upon answering such call it, by means of the circuit shown in FIG. VI, reenergizes the high call reverse ceiling relay for the next floor.

FIG. VII

A circuit for a second embodiment of the invention is illustrated in FIG. VII. Operation under the control of this circuit differs from that under the first circuit without the modification of FIG. VI in that as the highest call at or below a high call reverse ceiling or zone limit is answered the high call reverse ceiling is shifted to the next floor below the position of the answering car. In this arrangement all of the cars are restricted to operation below the then existing high call reverse ceiling unless they are skipped during upward travel as the high call reverse ceiling position shifts downwardly.

This circuit includes a family of high call reverse ceiling relays 2B through 11B which may be conventional single coil relays. Each of these high call reverse ceiling relays is provided with a pair of normally open and a pair of normally closed contacts. Each ceiling relay, once energized, is held in by current flow from a supply lead L7 through program relay contacts that are closed on normal service and shown in line 119, normally closed priority relay contacts PR, and a series chain of normally closed contacts of all the ceiling relays for floors below. A rectifier 30 connected to the high floor end of this series of contacts passes current to a coil of a bypassed hall call relay HCB shown in line 100. When any one of these high call reverse ceiling relays is energized it breaks the circuit through this series chain of contacts to the bypassed hall call relay HCB and through one of its normally open sets of contacts connects the coil of the now energized relay to that circuit below the break. Thus any one of these relays, when energized, seals itself in at the same time that it breaks the sealing circuit for any relays for floors above.

The other contacts of each of the relays cooperates with hall call relay contacts to provide a conventional high call reverse circuit shown along the left side of FIG. VII. Each of the high call reverse ceiling relays when energized divides the chain of normally closed contacts into two segments at a point between the points corresponding to that floor and the floor above and connects the lower segment of the circuit to the supply lead L7. By breaking the sealing circuit the high call reverse ceiling relay also deenergizes the bypassed high call relay HCB so that it closes its contacts in line 101 to energize the upper segment of the high call reverse circuit.

If it is desired to continuously operate the system on high call reverse a manually operated switch 32, in line 102, is closed to continuously energize the upper end of the high call reverse circuit.

In this circuit a high call reverse ceiling or zone limit is established whenever a car acquires a full load on its down trip. The circuit for establishing such a ceiling may be traced from the supply lead L7 through either a manually operated switch 34 or normally open contacts of the hall call bypass relay HCB and thence through a lead 36, down direction memory relay contacts DL in line 106, load switch contacts LS, normally closed lockout contacts LO, and normally closed brake relay contacts BK for energizing the selector machine brush 37 cooperating with contacts 38 that are connected to the energizing coils of the high call reverse ceiling relays. If, for example, the car is standing at the tenth floor as shown in FIG. VII this circuit energizes the high call reverse ceiling relay 9B to establish a high call reverse ceiling at the ninth floor. When the high call reverse ceiling relay 9B is energized it breaks the sealing circuit for all high call reverse ceiling relays for floors above that point including the circuit for energizing the bypassed hall call relay HCB line 100.

Once a high call reverse ceiling relay such as the relay 9B in line 106 is energized two slightly different modes of operation follow depending upon whether or not the manually operated switch 34 shown just above line 101 is opened or closed. As long as this switch 34 is closed any down traveling car upon acquiring a full load energizes the high call reverse ceiling relay for the floor below this relay and, if there are no other energized high call reverse ceiling relays below such floor, seals itself in to establish the high call reverse ceiling at the corresponding floor. If there is a high call reverse ceiling relay energized for a floor below the holding or sealing circuit for the higher energized high call reverse ceiling relay cannot be completed and this relay then drops out as soon as the car starts as it leaves such floor. When operating in this manner it is undesirable to allow a loaded down traveling car, when stopping for a car call, to energize the high call reverse ceiling relay for a lower floor. This undesirable operation is prevented by providing each car with a lockout relay LO, one of which is shown in line 104, which relay is energized as soon as both the load switch for the car and the car starting switch CS are closed as the car leaves the floor at which it acquired full load. This relay seals itself in through its contacts LO, line 104, and down memory relay contacts DL, line 106, so that it remains energized until the car revereses at the lower terminal. The lockout relay also opens its contacts in line 106 to prevent energization of any high call reverse ceiling relay.

A slightly different mode of operation results if the manually operated switch 34 is opened. In this case if there are no high call reverse ceiling relays operating when a car acquires a full load and the bypassed hall call relay HCB is energized to close its contacts in the circuit from the supply lead L7 to the lead 36 the loaded car then energizes the high call reverse ceiling relay in the manner just described. When such ceiling relay is energized it immediately breaks the circuit to the bypass hall call relay HCB and it, by opening its contacts HCB in line 101, prevents any car including the now loaded car from energizing, as a result of loading, any of the high call reverse ceiling relays until all such relays have been released. When operating in this manner with the switch 34 open the lockout relay LO does not have an opportunity to function since the energizing circuit through the lead 36 is broken before the car starts from the floor in response to closing its car starting switch CS. Therefore if the system is to be continually operated with the switch 34 opened the lockout relay may be omitted.

Each high call reverse ceiling relay, when operated, divides a high call reverse circuit appearing along the left side of FIG. VII into a lower and an upper segment and separately energizes the high end of the lower segment. This high call reverse circuit comprises a series chain of contacts including normally closed contacts of the down hall call relays S12D, S11D, etc., in order from the top floor and extending downwardly. Alternating with these contacts are normally closed high call reverse ceiling relay contacts 11B, 10B, 9B, etc. The junction point below the normally closed high call reverse ceiling relay contact for a given floor and above the down hall call relay contact for that floor is connected to a selector machine contact 39. This junction is also connected through a normally open high call reverse ceiling relay contact to the lead L7. A selector machine brush 41 cooperates with the contacts 39. In this high call reverse circuit the registration of any hall call breaks the circuit at a point just below the selector machine contact representing the floor at which the call is registered. Therefore the only selector machine contacts 39 that are energized are those that correspond to the highest floors at which calls are registered in each of the zones, that is, the highest call at or below the high call reverse ceiling relay and the highest call in the building.

When a car traveling in either direction reaches a floor at which there is an energized selector machine contact 39 of the high call reverse circuit current flows through a brush 41 cooperating with the contacts 39, a lead 42, normally closed contacts CB of a car call above relay CB and operating coil of the high call timing relay HCT. If the car is already traveling in the down direction this particular portion of the circuit has no effect. However, if the car is traveling in the up direction this circuit initiates a reversal of the direction memory relays of the car provided there is an actual down call at the same floor. Ordinarily there is an actual down call at the floor at which the segment of contacts 39 are energized so that the car will make a stop at that floor. However, there are conditions under which this is not true. For example, if a car is traveling upwardly in response to a single down call at a higher floor and another car answers that call the high call timing relay HCT is energized without there being any calls above the car to be answered. In this event the car proceeds to the upper terminal before reversing. The same situation may occur in the circuit of FIG. VII in that the call at a floor may be canceled before the high call reverse ceiling relay for that same floor releases. In thise case the car, instead of stopping at the high call reverse ceiling, proceeds on upwardly to the actual highest call in the system.

This circuit provides means for shifting the high call reverse ceiling downwardly thus eliminating that floor from the zone as the highest call in the zone below such ceiling is answered. This circuit may be traced from the brush 41, which is energized whenever the car arrives at the highest call at or below the ceiling, by way of a lead shown in line 107 that includes down direction memory relay contacts DL and normally closed bypassed hall call relay contacts HCB, and thence through the normally open stopping relay contacts V to the selector machine brush 37 to energize the high call reverse ceiling relay for the floor below the position then occupied by the car. Thus the high call reverse ceiling moves downwardly and the zone limits are reduced as the calls are cleared from beneath it.

A diode or rectifier 43 in included in the lead in series with the selector machine brush 41 to prevent current feedback to the high call reverse circuit by way of the sealing circuit for the high call reverse ceiling relays, the brush 37, the stopping sequence relay contacts V the contacts HCB and the down memory contacts DL. This is to prevent energizing the upper segment of the high call reverse circuit from the lower end thereof when the high call reverse ceiling relay for the floor above releases as the ceiling is shifted down.

In this circuit as described so far the only way in which an up traveling car can escape the high call reverse ceiling and proceed to the upper floors is if it has a higher car call registered which, by opening the contacts CB in line 103, prevents operation of the high call reverse timer relay HCT or if the car while traveling upwardly is between the old and new positions of the high call reverse ceiling as that ceiling shifts from the old to the new position. In this case the car is skipped and it then proceeds upwardly to the highest call.

This circuit thus tends to trap all of the cars beneath the high call reverse ceiling which may lead eventually to a number of partially loaded trips to the lobby floor, one such trip for each car. To avoid this possibility it is desirable to arrange the circuit so that the number of cars held below the high call reverse ceiling decreases as that ceiling moves downwardly through the building. One way of accomplishing this result is illustrated in FIG. VIII in which the high call reverse ceiling relays 2B, 3B, 4B etc. are of the slow dropout type, the dropout time being adjustable up to a maximum time interval which approximates the time required for a car to make a stop in answer to a call and then proceed on its way.

FIG. VIII

In the preceding circuit shown in FIG. VII the high call reverse ceiling, the top of the lower zone, moves down instantly when the highest call at or below the ceiling is answered. This makes it improbable that any car not having a higher car call registered can escape the ceiling and, as a result, all of the cars are trapped below the high call reverse ceiling to the complete disregard for any hall calls in the upper zone above the ceiling. This condition is corrected by the circuit shown in FIG. VIII in which the high call reverse ceiling relays are of the slow or timed dropout variety, i.e. the relay releases a predetermined time after its coil is deenergized. The contacts of these relays are arranged in the circuit so that operation of the high call reverse ceiling is suspended after a shift from one floor to the next lower floor, until the ceiling relay for the higher floor has released. Thus a time delay is provided during which time up traveling cars are permitted to pass the ceiling to answer the highest actual down hall call in the system. By varying the time delay at the various floors the circuit may be adjusted so that when the high call reverse ceiling it at a low floor most of the up traveling cars are allowed to go by to serve the upper zone while if the high call reverse ceiling is approximately half way up the building or toward the upper part of the building more of the up traveling cars are intercepted and reversed by the high call reverse ceiling. In this manner the cars are assigned to the low and high zones more or less in accordance with the number of floors then included in each zone. This circuit is further arranged so that the high call reverse ceiling is canceled the instant the last call at or below the ceiling is answered. The system then operates for a period of time as an ordinary single zone high call reverse system.

As an added feature the circuit shown in FIG. VIII is arranged so that it automatically institutes and maintains the high call reverse program of operation during up peak traffic conditions. This is accomplished by energizing a time delay relay each time an up traveling fully loaded car makes a stop.

In the diagram a series of high call reverse ceiling relays 2BT through 11BT, one for each intermediate floor of a twelve floor building, are shown along the right side of the diagram. Each of these relays, once energized, seals itself in through an energizing circuit that includes, among other contacts, normally closed contacts of each high call reverse ceiling relay below it in the series and its own normally open contacts. The series of normally closed contacts are shown in a vertical lane near the right side of the diagram. The high call reverse ceiling relays are further provided with two sets of back contacts and one set of front contacts that are incorporated in a high call reverse circuit shown along the left side of the diagram. One set of back contacts divides the high call reverse circuit into two segments at the floor corresponding to the energized high call reverse ceiling relay while the set of front contacts energizes the lower segment by current flow through normally closed or back contacts of all of the high call reverse ceiling relays for floors above the energized relay and normally open HCB contact in line 121. In this arrangement the lower segment of the high call reverse circuit is deenergized as long as two high call reverse ceiling relays are in their operated condition. This condition exists during the timing out interval of any of the high call reverse ceiling relays.

This circuit also includes a bypassed hall call relay HCB shown in line 136, a hall call bypassed timing relay HCBT shown in line 137, a priority reset relay PR shown in line 138 and, individual to each car, a lockout relay LO shown in line 125 and a high call reverse timing relay HCT shown in line 127.

The operation of this circuit may be easily understood by following the sequence of events through the onset of a down peak traffic condition. Immediately prior to the down peak traffic condition there is often a lull during which no calls are registered and the system is idle. At this time all of the relays illustrated in FIG. VIII are in their deenergized condition. Assume that a moment later, at quitting time when everyone wishes to leave immediately, down hall calls are registered at most of the floors. The registration of the down hall calls opens the contacts S12D, S11D, etc. for all of the floors at which calls are registered. Next assume that the first down traveling car acquires a full load at the eleventh floor. When it acquires a full load it closes its load switch to complete a circuit from a supply lead L8 by way of lead 50 in line 120, normally closed hall call bypassed relay contacts HCB, lead 51, down direction memory relay contacts DL, the now closed load switch contacts LS, normally closed lockout relay contacts LO and normally closed brake contacts BK, line 124, to energize a selector machine brush 52. The brush 52 engages contacts 53 to energize the tenth floor high call reverse ceiling relay 10BT. As soon as this relay picks up, which occurs immediately, it completes a circuit by way of its contacts in line 123, normally closed contacts of all of the high call reverse ceiling relays for floors below, and lead 54 to energize a coil HCB of the bypassed high call relay HCB, line 136. This relay thereupon picks up to close its contacts in line 137 at the same time that it opens its contacts in line 120. These contacts should be of the make-before-break variety so as to avoid any possibility of a buzzer action of the relay HCB. The buzzer action may also be avoided by bypassing the contacts HCB in line 120 with a series combination of a small resistor and a condenser. The closure of the bypassed hall call relay contacts HCB in line 137 completes a sealing circuit through intermittent service relay contacts INT and normally closed priority reset contacts PR to maintain the flow of current through the coil of the ceiling relay 10BT after the car leaves that floor.

The opening of the bypassed hall call relay contacts HCB in line 120 prevents any of the other cars from energizing the high call reverse ceiling relays in response to acquiring a full load through circuits duplicating the circuit shown in line 124.

The energization of the high call reverse ceiling relay 10BT causes it to close its contacts in line 126 to energize a tenth floor selector machine contact 55 by way of a circuit including normally open bypassed hall call relay contacts HCB shown at the left end of line 122 and normally closed contacts of all of the ceiling relays for floors above the tenth floor, in this case the normally closed contacts 11BT shown just below line 124. This circuit energizes the tenth floor high call reverse contact regardless of the presence of any higher hall calls. The tenth floor high call reverse ceiling relay 10BT also opens its contacts 10BT just below line 126 in the left lane of contacts to interrupt the flow of power to any lower high call reverse circuit contact. It also opens the circuit in the second lane of contacts to prevent any feed of power upwardly from the tenth floor of contact. Thus the operation of the high call reverse ceiling relay is effective to divide the high call reverse circuit into two segments the lower segment of which is energized independently of the upper segment. The upper segment is energized from its upper end through bypassed hall call timer contacts HCBT shown just below line 120.

To explain the sequence of events that occurs as the high call reverse ceiling is shifted downwardly in response to the answering of the highest call below the ceiling it will be assumed in FIG. VIII that a high call reverse ceiling had previously been established at the eleventh floor, as by a preceding car becoming fully loaded at the twelfth floor, and it will be further assumed that the next car to arrive at the eleventh floor is traveling upwardly. When this car arrives at the eleventh floor, the then high call reverse ceiling, its brush 56 engages the energized segment 55 for the eleventh floor so that current flows through a rectifier 57, a lead 58, up hall call contacts UC that are open as long as there are higher up hall calls or the car has stopped for an up call, and car call above contacts CB, line 127, to energize a high call reverse timer relay HCT. It will further be assumed that a down call existed at the eleventh floor so that upon the energization of the high call reverse timer relay HCT the directional relays for the up traveling car are reversed as the car stops at the eleventh floor. As the car starts its slowdown for the eleventh floor current flows from the rectifier 57 through stopping relay contacts V, down direction memory contacts DL, and now closed bypassed hall call relay contacts HCB, to energize the tenth floor high call reverse ceiling relay 10BT. When this relay picks up it opens its contacts 10BT just below line 122 in the lane of contacts near the right of the diagram to break the sealing circuit to the eleventh floor ceiling relay 11BT. Also, as the car picked up the stopping signal for the eleventh floor and started its slowdown it canceled the signal at such floor thereby closing contacts S11D at about the same instant that contacts 10BT in series therewith opened. This breaks the circuit to the tenth floor high call reverse circuit contact to suspend operation of the high call reverse ceiling until the eleventh floor relay 11BT drops out to close its contacts in the left lane just below line 124 and complete a circuit from the lead 50 through normally open but now closed contacts 10BT to the tenth floor contact 55.

The high call reverse ceiling is thus suspended or inactivated for a period of time equal to the dropout time of the releasing high call reverse ceiling relay. The timing of the high call reverse ceiling relays 2BT through 11BT is preferably adjusted to short intervals for the relays corresponding to the upper floors of the building and longer intervals for the relays corresponding to the lower floors. Preferably the timing for the relays 2BT through 4BT should be generally equal to the length of time required for a down traveling car to stop and receive the passengers waiting at a floor and depart. With this timing there is only a slight chance of stopping an up traveling car below the high call reverse ceiling as long as there is a car in position to promptly answer the highest call below such ceiling. For example, suppose the high call reverse ceiling is located at the fifth floor and a call is registered at the fifth floor. As this call is answered and the fourth floor ceiling relay 4BT is energized it prevents any flow of current from the fifth floor segment to the lower segment by way of the now closed fifth floor down hall contact S5D at the same time that the now releasing fifth floor ceiling relay contact 5BT prevents any flow of power through the left lane of contacts and the now closed front contact 4BT connecting the left lane to the high call reverse circuit.

It may be observed that as long as the fifth floor high call reverse ceiling relay has not dropped out the corresponding floor selector segment is energized to operate a high call timing relay HCT. This is without effect, however, because there is no down call then registered at the fifth floor and any up traveling cars proceed past this floor and on up to the highest actual call in the system. If the fifth floor ceiling relay release time is equal to or greater than the time required to answer the call at the fifth floor the car may proceed to the fourth floor and energize the third floor ceiling relay 3BT to deenergize the fourth floor ceiling relay 4BT before the fifth floor ceiling relay 5BT has released. This overlap in timing continuously holds the high call reverse ceiling out of action. Should a car be delayed in answering these calls or should it become fully loaded so as to leave one or more of these calls the release of the deenergized relay then reestablishes the flow of power to the floor selector machine contact to reestablish the high call reverse ceiling and thus stop the next up traveling car at the highest call at or below such ceiling. In this manner a number of cars, not needed for immediate service in the local zone, are permitted to serve the upper zone but an up traveling car is pressed into service for the lower zone as soon as it is needed.

When the last call below the high call reverse ceiling is canceled by a car answering that call a circuit is completed to the bottom end of the high call reverse circuit and thence through a lead 60 to an operating coil PR of a priority reset relay PR shown in line 138. This relay thereupon opens its contacts PR in line 137 to immediately deenergize any high call reverse ceiling relays that may then be energized as well as the bypassed hall call relay in line 136 and the timing relay HCBT in line 137. The bypassed hall call relay HCB immediately releases to open its holding contacts HCB in line 137 and its contacts HCB in line 122 to deenergize the lower segment of the high call reverse circuit. By opening its contacts HCB in line 122 the priority reset relay is deenergized so that it closes its contacts in line 137 to prepare the circuit for the next cycle of operation. Thus the circuit is immediately returned to single zone high call reverse operation even though one of the lower floor ceiling relays has not yet released. As soon as all of the ceiling relays are released a second cycle of operation may begin as a down traveling car acquires a full load.

It should be noted that the bypassed hall call timing relays HCBT shown in line 137 is arranged to hold its contacts in line 121 closed for an appreciable interval, in the order of 30 seconds to a minute or more depending upon circumstances, after the lowest call below the ceiling has been canceled. During this time which is probably still part of a down peak traffic period the cars operate in an ordinary single zone high call reverse program. This avoids the extra stops that may be incurred if the cars run to the upper terminal before reversing.

If a manually operated switch 62 shown in line 121 to bypass the normally closed bypassed hall call relay contacts HCB in line 120 is closed a slightly different mode of operation results. With the switch closed any car acquiring a full load energizes the ceiling relay for the floor below. If this tends to establish a ceiling lower than that already in effect the lower ceiling relay seals itself in to establish a new high call reverse ceiling. If this relay so energized is above a then energized ceiling relay it temporarily shifts the ceiling to the floor immediately below the floor at which that car is acquiring a full load. The effective high call reverse ceiling for the system is, therefore, at the highest call below the highest stopped loaded car and remains at such point until a short time after that car starts. This operation does not cancel a lower ceiling and such lower ceiling becomes effective upon the dropout of the higher ceiling relay.

When the switch 62 is closed and it is desirable to prevent a loaded down traveling car that is stopping for a car call from establishing a lower high call reverse ceiling a lockout relay LO, line 125, is provided. This relay LO is energized when the cart starts downwardly after acquiring a full load and seals itself in through its lockout contacts LO in line 125 so that it remains energized until the car reverses. As long as the lockout relay LO is energized it opens its contacts in line 124 to prevent that car from energizing any ceiling relay.

This circuit may also be used to establish high call reverse operation during up peak traffic conditions. Thus, if a double throw switch 64 in line 124 is operated to close its contacts 64a any loaded car stopping at a floor when there is no high call reverse ceiling in operation picks up the ceiling relay for the floor below and, through contacts of that and lower relays, energizes the bypassed hall call timing relay HCBT in line 137 as well as the bypassed hall call relay in line 136. Since there are probably no down hall calls registered during up peak traffic conditions the priority reset relay PR is immediately energized to open its contacts in line 137 to deenergize the bypassed hall call relay HCB as soon as the loaded car departs from a floor at which it picked up the ceiling relay. However, the bypassed hall call timing relay HCBT keeps the high call reverse circuit energized through its contacts HCBT just below line 120 for the duration of its timing period. Since this timing period is longer than the normal loading time of the next car it follows that as long as the loaded cars promptly move upwardly from the lower terminal and stop at their first car calls they successively reenergize the timing relay HCBT and thus extend the period of high call reverse operation during up peak traffic conditions. When the up traffic subsides so that the cars are no longer fully loaded and that condition is maintained for the dropout time of the timing relay HCBT the system reverts to normal operation.

FIG. IX

The systems shown in FIGS. VII or VIII effectively divide, during down peak traffic conditions, the building into two zones, an upper and a lower, by a high call reverse ceiling functioning as the upper end or limit of the lower zone which ceiling successively shifts down from floor to floor as the highest calls below the ceiling are answered. In tall buildings it may be desirable to further zone the system, for example, by having a possibility of three zones comprising a lower zone of a given number of floors, an intermediate zone extending from the top of the lower zone to a shiftable high call reverse ceiling and a top zone comprising the remainder of the building. This system may be thought of as an arrangement similar to that shown in FIG. VIII with the additional feature that as soon as the high call reverse ceiling of FIG. VIII is shifted downwardly past a selected lower floor such as the sixth floor of a building it permits the establishment of another high call reverse ceiling that shifts downwardly through the upper and intermediate portions of the building as the highest call below that ceiling is answered.

The circuit shown in FIG. IX provides this type of operation. The circuit shown in FIG. IX above and including line 148 is similar to the circuit shown in FIG. VIII except for some slight modifications of the car circuits shown between the brushes. A generally similar circuit of ceiling relays is provided for the low zone comprising the lower floors, in this case for the second to fifth floors inclusive, which relays are shown in lines 151 to 161.

Additional relays and contacts not previously listed but which are included in FIG. IX include:

LSH _____ Half load switch.
ST _____ Stop timer.
LZ _____ Low zone ceiling relay.
PRL _____ Low zone priority reset.

This circuit provides for shifting the high call reverse ceiling downwardly as the highest call at or below this ceiling is answered and also suspends the operation of the ceiling for a limited time after each shift. The provision of the limited suspension is accomplished in a slightly different manner in the circuit shown in FIG. VIII in that each of the high call reverse ceiling relays is provided with a time delay dropout interval that is slightly longer than the time required for the selector machine to move its brushes from one set of contacts to the next while making a one floor run. This time is ordinarily in the order of only a few seconds. To suspend operation of the high call reverse ceiling for a longer interval of time, contacts and an additional brush are added, as shown in line 141, for each of the cars. These contacts comprise a normally closed half load switch LSH that opens when the car acquires a half load, normally open low zone ceiling relay contacts LZ, and normally closed stop time relay contacts ST that open at the expiration of a predetermined time interval after the car stops at the floor and remain open until the car stops at the next call. These contacts may be part of the ordinary interference timer commonly used on automatic elevators to indicate that a car is being unduly delayed. The brush that is energized through these contacts is arranged to energize the ceiling relay for the floor at which the car is then standing provided it is answering the highest call at or below the then existing high call reverse ceiling. Thus in FIG. IX, assuming that a high call reverse ceiling had been established at the ninth floor and relays HCB and HCBT are energized current flows from a supply lead L-10 downwardly through the left lane of normally closed ceiling relay contacts to the ninth floor ceiling relay contacts 9BT in line 143 thence through a selector machine contact 70 and brush 71 and the circuit shown in lines 142 and 141 to energize the eighth floor ceiling relay 8BT in line 143. If the low zone ceiling relay LZ is also energized as the car stops at the floor and closes its timer contacts ST in line 141 it also energizes the ninth floor ceiling relay 9BT.

The simultaneous energization of two high call reverse ceiling relays establishes a potential high call reverse ceiling at the floor corresponding to the lower relay, in this case the eighth floor, and an actual high call reverse ceiling at the highest call at or below the higher ceiling relay. The actual ceiling is ineffective without a call since the cars will not stop at intermediate floors unless there is a call for the floor. Thus there is a potential high call reverse ceiling established at the eighth floor which becomes an actual ceiling as soon as the ninth floor relay is released. This release occurs either by the car being unduly delayed to open its stop time relay contacts ST or by the car acquiring a half load to open its contacts LSH in line 141.

This arrangement thus provides that a down traveling car which is answering the highest call at or below the ceiling suspends the operation of the ceiling as long as it is less than half loaded and is proceeding promptly in answering the calls. But as soon as it acquires its half load the ceiling becomes effective to stop the next up traveling car at the highest call below the down traveling car so that it may promptly assist the down traveling car in serving any calls below.

As the high call reverse ceiling is thus shifted downwardly the highest call below the ceiling eventually is at or below the sixth floor. When such call is answered, assuming it to be at the sixth floor, that car through its brush 71 and circuit including its relay contacts V energizes the fifth floor high call reverse ceiling relay 5BT. When this relay is energized it immediately closes its contacts 5BT in line 150 to complete a circuit to the low zone relay LZ in line 157 so that it may close its contacts in line 158 to provide a sealing circuit for the fifth floor ceiling relay. The low zone relay LZ closes its contacts in line 153 to energize the low zone segment of the high call reverse circuit thus immediately establishing a high call reverse ceiling at the fifth floor. Operation of this relay does not by itself deenergize any higher high call reverse relays since their sealing circuit is completed by the bypassed hall call relay contacts HCB and priority reset relay contacts PR in line 148 which serve the sixth and higher floor ceiling relays. However, upon the cancelling of the sixth floor down call a circuit is completed through a lead, line 152, tapped into the high call reverse circuit just below the sixth floor normally closed contact S6D so that current may flow through this lead and now closed low zone relay contacts LZ to energize the priority reset relay PR shown in line 149. The reset relay PR opens the sealing circuit for the sixth floor and higher ceiling relays. It may be noted that even though the priority reset relay PR has opened its contacts PR in line 148 the bypassed hall call relay HCB does not drop out as long as the car is standing at the sixth floor and keeps its contacts shown in line 141 closed to energize the sixth floor ceiling relay. As soon as the car leaves the sixth floor, its normal stopping time expires, or it acquires at least a half load it opens the circuit to the sixth floor ceiling relay which in releasing deenergizes the bypassed hall call relay HCB since the priority relay PR is now energized. This leaves the upper series of high call reverse ceiling relays all deenergized and therefore in condition to start another high call reverse ceiling at an upper floor of the building.

If it should happen that there are no calls registered in the lower zone at the time that the last call in the higher zone at or below the high call reverse ceiling is answered the low zone priority reset relay PRL is immediately energized when that last call below the ceiling is answered and it, in turn, by closing its contacts in line 150 energizes the upper zone priority reset relay PR. As soon as the car answers the last call below the ceiling and the reset relays PRL and PR are energized the bypassed hall call relay HCB in line 148 drops out as well as any then energized ceiling relays so that the system reverts to normal high call reverse without zoning during the duration of the timing period of the bypassed hall call relay timer relay HCBT.

This circuit thus provides efficient service for a down peak traffic condition in that as soon as a down traveling car acquires a full load it establishes the high call reverse ceiling for the next lower floor. The highest call at or below this ceiling may then be answered by either an empty up traveling car or a down traveling car and when such call is answered the ceiling is shifted down to the floor immediately below the just answered call. Furthermore the circuit provides that, during the normal stopping time of a car, up traveling cars are permitted to pass that particular ceiling and to proceed to either the highest actual call in the system or to a high call reverse ceiling that may then be in effect. This particular circuit also has the added feature as previously explained that any high call reverse ceiling is put into effect immediately below a car that is answering the previous highest call and has also acquired a half load.

A system may be divided into a greater number of zones than that shown in FIG. IX by repeating the circuit illustrated in lines 149 to 159 for each such added zone. Furthermore a high call reverse ceiling once started in the upper zone continues to move down as the highest call below the ceiling is answered and progresses from zone to zone without interruption. In this respect it is similar to the circuit shown in FIG. VIII but differs in that additional high call reverse ceilings may be instituted in a higher zone as the preceding ceiling shifts from one zone to the next.

FIGS. X AND XI

In the embodiment of the invention illustrated in FIGS. X and XI the circuit is arranged, when there is no established high call reverse ceiling, to recognize the first down traveling car to acquire a full load and to energize a ceiling relay at each hall call that is by-passed during that down trip of the recognized car. The highest of such energized high call reverse ceiling relays establishes an actual high call reverse ceiling which remains in effect until that call is answered. As that call is answered the next lower high call reverse ceiling relay becomes effective in establishing the actual high call reverse ceiling. This continues until all of the calls bypassed by the recognized car are answered. As soon as all such calls are answered the system reverts to its normal condition without a high call reverse ceiling in effect and remains in such condition until another car acquires a full load. When such car acquires its full load it starts a second cycle of operation by again energizing the high call reverse ceiling relays for each of the floors at which calls are bypassed by that loaded car.

To avoid trapping too many cars below a low high call reverse ceiling the circuit is further arranged so that only a limited number of cars are subject to high call reverse in a low zone of floors when the high call reverse ceiling is at or below the sixth or seventh or other selected intermediate floor of the building.

In the circuits as shown in FIGS. X and XI, when a down traveling car acquires a full load a circuit is completed from a positive supply lead L-12 through a circuit in line 173 that comprises down directional memory relay contacts DL, normally closed brake relay contacts BK, now closed bypassed hall call relay contacts HCB, and load switch contacts LS to energize a memory relay R2. This relay immediately closes its contacts in line 172 to complete a holding circuit that includes the directional memory relay contacts DL. The bypassed hall call relay HCB, shown in line 206, FIG. XI, is energized at this time since it is assumed that there are no unanswered previously bypassed calls having their high call reverse ceiling relays energized. As the loaded car, now having its memory relay R2 energized, proceeds downwardly and reaches a registered down call, for example at the eighth floor, a circuit is completed from the supply lead L-12 through the eighth floor down hall call relay contacts S8D, its selector machine contact 100 and brush 101 shown in line 177, down memory relay contacts DL, and now closed memory relay contacts R2 to a brush 102 cooperating with selector machine segment 103 to energize the eighth floor high call reverse ceiling relay 8B. This relay immediately closes its contacts 8B in line 178 and thus remains energized as long as a down call is registered at the eighth floor. In like manner the high call reverse ceiling relays for any other registered hall calls are energized as the car bypasses the calls.

When one of the cealing relays of FIG. X is energized it closes and opens its normally open and normally closed contacts respectively shown in FIG. XI so as to interrupt a high call reverse circuit shown along the left side of FIG. XI at a point just above the junction corresponding to that floor and energizes that junction, if it is the highest energized ceiling relay, through normally closed contacts of all of the higher high call reverse ceiling relays. As a result the high call reverse circuit is divided into two segments and the upper end of the lower segment is energized independently of the upper segment. This effectively divides the system into two zones in which all of the previously bypassed calls are in the lower zone which becomes progressively smaller as the top remaining calls in the zone are answered.

It should be noted that the memory relays R2, one for each car, can be picked up only in the event there are no bypassed hall calls registered. Since the bypassed hall call relay HCB in line 206 remains energized until one of the high call reverse ceiling relays is picked up as the result of bypassing a call there is a period of time starting when a car acquires a load and ending when the car bypasses a call during which time interval other cars acquiring full loads may also have their R2 relays energized. This does not appreciably alter the operation of the circuit but it is essential that once one of the high call reverse ceiling relays pulls in and is energized that it be impossible for cars subsequently acquiring the full load to set up their memory relays. If this limitation were not imposed it would be impossible under certain conditions to clear all of the high call reverse ceiling relays so as to provide service for the higher floors.

To prevent trapping too many cars below a low high call reverse ceiling an assignment circuit is included. This assignment circuit comprises high call pass relays HCP and high call operate relays HCO shown in lines 185 and 187 which cooperate with a high call loading relay HCL in line 201 to provide that if the ceiling is below the fourth floor only one car is subject to high call reverse in the low zone i.e. below the ceiling. If the ceiling is at the fourth or fifth floor only two cars can be assigned to the low zone. Likewise if the cealing is at the sixth or seventh floor three cars can be assigned to the low zone.

This assignment circuit is arranged so that any car not having acquired a full load and being in the zone above a selected intermediate floor, which for example may be the sixth floor, has its high call pass relay HCP energized by current flow from the lead L-12, normally closed load switch contacts LS, a brush 110, a selector machine bar 111 that extends through the high zone, and thence to the operating coil HCP of the high call pass relay for that car. If the car it at or below the sixth floor its brush 110 engages a second selector machine bar 112 that is connected through normally open high call operate relay contacts or normally closed assignment relay contacts HCL to energize the high call operate relay coil HCO in line 187. These relays are duplicated for each car. The high call operate relays HCO, one for each car, have contacts arranged in a "contact tree" illustrated between lines 197 and 203 of FIG. XI. If there is no car in the low zone, i.e. at or below the sixth floor none of the high call operate relays HCO are energized and hence all of the contacts shown in the contact tree are in the positions actually shown. In this condition there is no path through the tree from the high call reverse circuit along the left side of the diagram to energize the assignment relay HCL in line 201. Therefore it closes its contacts in line 187 for each of the cars. The first unloaded car to enter this low zone either from the top or bottom energizes its high call operate relay HCO which immediately seals itself in to the contact bar 112 so as to remain energized as long as that car is in the lower zone and not full loaded. As long as this relay HCO is operated it closes its contacts in line 192 so that the car is then subject to high call reversal at the highest call at or below the ceiling established by the energized ceiling relays.

As soon as the high call operate relay for one of the cars operates it shifts its contacts in the contact tree so that if the high call reverse ceiling is below the fourth floor a circuit is completed which may be traced from a lead 113, that is now energized since the high call reverse ceiling is below the fourth floor, through the contact assembly to energize the assignment relay HCL. As long as the assignment relay HCL is energized it, by opening its contacts in line 187 for each of the cars, prevents the energization of the high call operate relay HCO for any of the other cars.

If the high call reverse ceiling is at the fourth or fifth floor lead 113 in line 203 is deenergized but leads 114 and 115 are both energized. Since there are two breaks in any circuit through the relay tree from the lead 114 to the operating coil of the assignment relay the assignment relay is not energized until at least two of the high call operate relays HCO are energized indicating that there are two cars then in the low zone. Of course as soon as this occurs the assignment relay HCL is energized to prevent any further assignment. In like manner if the high call reverse ceiling is at the sixth or seventh floor only the lead 115 in line 197 is energized and, as a result, at least three of the high call operate relays HCO must be energized before the assignment relay HCL is energized to prevent any further assignment to the lower zone.

This assignment circuit, by limiting the number of cars assigned to the lower zone in accordance with the number of cars operating in such zone, tends to distribute the cars between the zones in accordance with the number of floors included in each zone. At the same time it provides, by insuring reasonably prompt service for any previously bypassed calls, that no call will remain unanswered for an undue period of time.

FIG. XII

FIG. XII illustrates a timing circuit which may be employed to limit the number of cars in the low zone by suspending operation of the high call reverse ceiling, without cancelling such ceiling, for a limited time after each low zone ceiling call is answered. In this circuit, as in the one just described, ceiling relays are energized for each of the floors at which a down call is bypassed following the start of a particular cycle of operation. Thus assuming that there are no relays energized the bypassed hall call relay HCB in line 232 is energized and its contacts HCB in line 211 for each of the cars are closed. As soon as a down traveling car, while standing at a floor, acquires a full load a circuit is completed from lead L-14 through a series of contacts in line 211 for that car which include down memory relay contacts DL, normally closed brake relay contacts BK, the now closed bypassed hall call relay contacts HCB, and load switch contacts LS to energize a memory relay R2 for that car. This relay R2 immediately seals itself in through a circuit including the just mentioned down relay contacts DL and its contacts R2, line 210. The memory relay R2 also closes its contacts in line 216 so that as this car bypasses a registered down hall call it energizes the ceiling relay for that particular floor. Thus assuming that the bypassed call is at the tenth floor the circuit shown in line 216 is completed to energize the tenth floor ceiling relay 10B. This relay immediately closes its contacts in line 217 to seal itself in as long as the call remains registered at the tenth floor. In the same manner this down traveling car energizes the ceiling relays for every bypassed down hall call.

The highest of the ceiling relays, that were energized in response to the bypassing of registered hall calls, divides the high call reverse circuit shown in lines 221 to 232 into an upper and lower segment and energizes the upper end of the lower segment as well as deenergizing the bypassed hall call relay HCB to prevent any other car subsequently loaded before all of the prior calls are cancelled from energizing any further ceiling relays. As each ceiling call is answered the ceiling drops to the next highest previously bypassed call. Thus up traveling cars are required, unless they have higher car calls, to reverse at the down call at the ceiling. It may be noted that in this circuit a high call reverse ceiling cannot exist without the presence of a corresponding call.

To avoid trapping too many cars below the ceiling when the ceiling gets down to the lower floors each of the ceiling relays for the lower floors such as second, third, fourth, and fifth is equipped with a ceiling timing relay such as relay 5BT shown in line 219 and energized in parallel with the fifth floor ceiling relay 5B. These timing relays are provided with a slow dropout timing feature which may be adjusted to be in the order of the same length of time it takes a car to stop and answer a call. These timing relays have normally closed contacts included in the series chain of contacts along the left side of the high call reverse circuit such as the contacts 5BT shown below line 227, 4BT shown below line 229 and 2BT shown below line 231. These timing relays in this circuit combination suspend operation of the high call reverse ceiling circuit for the lower floors during the dropout time of the timing relays. Thus when a car answers a call at the fifth floor which is a ceiling at that time it cancels that call and thus deenergizes the ceiling relay 5B and its timing relay 5BT. Deenergizing the relay 5B immediately deenergizes the fifth floor high call reverse contact in line 227 and the delayed closing of the normally closed contact 5BT below line 227 prevents energizing the fourth floor or lower high call reverse segments during the dropout time of the fifth floor timing relay 5BT. In the absence of any energized high call reverse circuit segment the up traveling cars are not subject to this high call reverse ceiling but rather proceed to the highest actual call in the system.

This arrangement has the advantage of automatically establishing a high call reverse ceiling at a lower bypassed call in the event that another car already in the zone fails to promptly answer the call either by reason of being delayed or by reason of acquiring a full load at a higher floor and bypassing the call.

FIGS. XIII AND XIV

Instead of setting up high call reverse ceilings at each of the calls bypassed by a loaded car the circuit may be arranged so that the first car to acquire a full load on a down trip immediately energizes high call reverse ceiling relays for each of the down calls then registered. As long as any of these calls are still unanswered the system operates on high call reverse and reverts to normal operation as soon as the last of these calls is answered. To further distribute the service during periods of down peak the system is divided into zones, three being indicated in the drawings, and each up traveling car is reversed at the highest call in the first zone that it reaches in which there is no car available for answering calls.

In these circuits, referring particularly to FIG. XIII, representative ones of a series of ceiling relays 2B through 11B are illustrated in lines 244 to 248. These relays are energized from a supply lead L-16 as soon as a down traveling car becomes fully loaded so as to pass current from the lead L-16 through load switch contacts LS of that one of the cars A, B, C and D that is then loaded, through down memory relay contacts DL for that car, normally closed program relay contacts H1 in line 242, now closed bypassed hall call relay contacts HCB, and thence through diodes 120 and down hall call relay contacts for the various floors to the operating coils of the ceiling relays 2B–11B. Thus the ceiling relay for any floor at which a down call is registered is picked up and seals itself in through its own contacts connected between the supply lead L-16 and the down hall call relay contacts leading to the particular ceiling relay. A very brief time after the ceiling relays are energized the bypassed hall call relay HCB drops out to open the circuit in line 242 and thus prevent the energization of many more ceiling relays during that cycle of operation.

The bypassed hall call relay HCB, when deenergized, closes its contacts in line 249 to energize zone assignment circuits shown in lines 250 to 258. In this circuit as long as an unloaded car having no unanswered car calls is in the top zone it energizes its top zone relay HD8 by way of selector machine brush 125 and bar 126. If it is in the region of the fifth to seventh floors it energizes its intermediate selector machine bar 127 and, if it is the only car in that zone, it also operates its intermediate zone relay HD5. Likewise if the car is in the low zone, i.e. at the second, third or fourth floors, it energizes its selector machine bar 128 and, if it is the only car in such zone, it also energizes its low zone relay HD2.

Exclusion relays to prevent the energization of the zone relays HD when there is already a car in the zone are provided in lines 256 to 258. The circuits in lines 256 and 258 are similar, that in line 256 operating the intermediate zone exclusion relay HX5 as long as there is a ceiling relay energized in the intermediate zone to deenergize intermediate zone hall call relay HC5 and close its contacts HC5 and none of the intermediate zone relays HD5 are energized indicating that there is no car already assigned to the intermediate zone. If this circuit in line 256 is completed the intermediate zone exclusion relay HX5 is energized to close its contacts in line 252 for each of the cars that reaches the intermediate zone thereby enabling the first available car to energize its HD5 relay as it enters the zone. This exclusion relay HX5 may also be energized even though there is a car in the intermediate zone if there are no calls registered in the upper zone. This is by way of normally open contacts HE8 of the top zone call relay HE8 shown in line 267. Once a car picks up its intermediate or low zone relay HD5 or HD2 that relay seals in around its exclusion relay contacts HX5 or HX2 so as to remain energized when the exclusion relay drops out as a result of opening the circuit in line 256 or 258. The energized zone relay remains energized until the car either acquires a full load or leaves that particular zone.

Referring to FIG. XIV, any up traveling car becomes subject to high call reverse whenever any of its zone relays are energized or the system is operating on up peak program with program contacts H1, shown in line 262, closed. Assuming that a number of ceiling relays have been operated, the next up traveling car starting from the lobby floor as it reaches the second floor, assuming that there is no other car in the low zone, operates its HD2 relay and thereupon becomes subject to reverse at the highest operated ceiling relay in the low zone. The second up traveling car, since there is already a car in the low zone, proceeds to the intermediate zone and reverses at the call at the ceiling in the intermediate zone. Likewise the third up traveling car, assuming that the other two cars have not acquired full loads and are still operating in their respective zones, travels upwardly until it reaches the upper zone.

As soon as all of the calls at which ceiling relays have been energized in the low zone are answered the low zone call relay HC2 is energized so that it opens its contacts in line 258 thereby releasing the low zone exclusion relay HX2 so that no car may be assigned to the low zone. Likewise as soon as all of the calls in the intermediate zone at which ceiling relays were energized are answered the intermediate zone call relay HC5 is energized so that it drops out the intermediate zone exclusion relay HX5 to prevent any cars from being assigned to the intermediate zone. When both the low zone and intermediate zone calls relays HC2 and HC5 are energized and the last ceiling relay for the upper zone is released a circuit is completed to energize the bypassed hall call relay HCB in line 268 thus indicating that all of the ceiling relays have been released. The system then reverts to regular operation with the cars traveling to the terminals. This completes a cycle of operation and another cycle may be initiated as soon as a down traveling car acquires a full load.

This circuit thus establishes potential high call reverse ceilings at all of the floors at which signals are registered at a start of a cycle and provides high call reverse operation in each zone not having a car then serving that zone until all the calls registered at the start of the cycle are answered. The answering of the last of such calls completes the cycle and restores normal operation. This arrangement prevents any monopolizing of cars by intending passengers at the higher floors and thus equalizes the service thus rendered by the bank of elevators.

The foregoing control circuits all provide for the orderly serving of down hall calls regardless of the density of the traffic. In no case can a call be ignored much longer than the time required for a car of unlimited capacity to make a round trip. In most of the circuits the maximum time required to reach a particular call is much less since any call is, even under extreme conditions, reached in a time interval, in general, equal to a little more than twice the time required to make a stop multiplied by the number of floors at which calls are registered divided by the number of cars. The maximum waiting time occurs when the cars each receive a full load at the floor at which they reverse and thus must make a trip to the lobby for each down call. Many of the circuits very nearly approach the condition that no floor will be served twice while there is an unanswered call at another floor.

In the preferred circuits this is accomplished by restricting service in the system to one or more zones that include the down calls to be promptly served, directing the available cars to the highest calls in the zone or zones, and shrinking the zone or zones as such highest calls are answered. Some circuits permit service outside the zone when the zone has shrunk to a predetermined size or adequate service is rendered to the zone while others completely remove the zone restriction when a car responds to the restriction and reverses at the top of a previously established zone.

Various modifications may be made in the specific circuits without departing from the scope of the invention.

Having described the invention, I claim:

1. In an elevator system, in combination, a plurality of cars adapted to serve a plurality of floors, means for registering calls for service, load sensing means, a reverse circuit cooperating with the cars to reverse each car when it reaches the furthest call in its direction of travel, means for each floor adapted to divide said reverse circuit into portions and to separately energize the portions thereof, and circuit means including the load sensing means for energizing at least one of said circuit dividing means when a predetermined load is sensed.

2. In an elevator system, in combination, a plurality of cars adapted to serve a plurality of floors, means for registering calls for service, a load sensing means for each car, a reverse circuit cooperating with the cars to reverse each car when it reaches the furthest call in its direction of travel, means for each floor adapted to divide said reverse circuit into portions and separately energize the portions thereof, circuit means including the load sensing means of a car for energizing at least the circuit dividing means for the floor below the car in the event the car is loaded and there is no dividing means energized, and means for deenergizing said dividing means when the next lower call is answered.

3. In an elevator system, in combination, a plurality of cars adapted to serve a plurality of floors, means for registering calls for service, a load sensing means for each car, a farthest call reverse circuit cooperating with the cars for reversing each car as it reaches the farthest call, means for each floor adapted to divide the farthest call reverse circuit at that floor and energize a portion of the circuit, circuit means including the load sensing means of a car for energizing at least the dividing means for the next nearer floor when such car acquires a full load and no dividing means is energized, said reverse circuit serving to reverse the next car at the farthest call at or nearer the energized dividing means, and means for deenergizing the dividing means when the call at or next to the said energized dividing means is answered.

4. In an elevator system, in combination, a plurality of cars adapted to serve a plurality of floors, means for registering calls for service, a load sensing means for each car, a reverse circuit that cooperates with the cars for reversing each car as it reaches the farthest call, control means for each floor, each control means having an energizing and a neutralizing means, circuit means including the load sensing means of a loaded car for energizing that one of said control means corresponding to the floor below the loaded car, circuit means including contacts of control means for lower floors for maintaining the energization of such energized control means, means responsive to the answering of the next lower call adapted to energize the neutralizing means of any higher energized control means, and means responsive to the absence of calls below the energized control means for deenergizing the control means.

5. In an elevator system, in combination, a plurality of cars adapted to serve a plurality of floors, means for registering calls for service, a load switch for each car, a farthest call reverse circuit that cooperates with the cars for reversing each traveling car as it reaches the farthest call, dividing means for each floor arranged to divide the farthest call reverse circuit, a bypassed hall call relay, circuit means including the load switch of a loaded car arranged to energize the dividing means for the next lower floor, said dividing means being connected to deenergize said bypassed hall call relay and all higher dividing means, and circuit means including a farthest call reverse relay and said bypassed hall call relay adapted to energize the dividing means for the next lower floor as a car answers the highest call below an energized dividing means.

6. An elevator system according to claim 5 including means for deenergizing the dividing means in the event the car energizing such means starts with less than a full load.

7. An elevator system according to claim 5 including circuit means adapted to energize the dividing means for the next floor as a car slows down to answer the farthest call at or next an energized dividing means and means adapted to deenergize such energized dividing means as the car stops.

8. In an elevator system, in combination, a plurality of elevator cars adapted to serve a plurality of floors, means for registering calls for service, a load switch for each car, a high call reverse circuit, a ceiling relay for each intermediate floor included in the high call reverse circuit and adapted when energized to break the high call reverse circuit immediately above the floor and energize the portion immediately below the break, a sealing circuit for each ceiling relay that includes contacts of the down hall call relay for that floor, a control relay for each car, a bypassed call relay that is energized when no ceiling relay is energized, circuit means including the load switch and the bypassed call relay to energize the control relay when there are no ceiling relays energized and the car acquires a full load, and circuit means for energizing the ceiling relay for each down hall call passed by the car having its control relay energized, whereby the response of the elevator cars is directed to the bypassed hall calls.

9. In an elevator system, in combination, a plurality of elevator cars adapted to serve a plurality of floors, means for registering calls for service, a load switch for each car, a high call reverse circuit, a ceiling relay for at least some of the intermediate floors, each ceiling relay being arranged to break the high call reverse circuit and complete a circuit including normally closed contacts of all higher ceiling relays to energize the high call reverse circuit immediately below the highest break, a bypassed hall call relay, circuit means including said load switches and said bypassed hall relay for energizing the ceiling relay for each hall call bypassed by a loaded car provided no ceiling relay was energized when said car acquired its load, a sealing circuit for each ceiling relay that includes contacts of the associated hall call relay, means for indicating the presence of a car in a lower zone of floors, and circuit means responsive to the indicating means arranged to limit the number of cars assigned to high call reverse according to the number of floors below the highest energized ceiling relay.

10. In an elevator system, in combination, a plurality of elevator cars adapted to serve a plurality of floors, means for registering calls for service, a load switch for each car, a high call reverse circuit, a ceiling relay for at least some of the intermediate floors, a bypassed call relay, each ceiling relay being arranged to break the high call reverse circuit and to energize the portion below the break through normally closed contacts of higher ceiling relays, said bypassed call relay being energized through a series of normally closed contacts of said ceiling relays, circuit means including the bypassed hall call relay and the load switches of the cars for energizing the ceiling relays for hall calls bypassed by a loaded car, a sealing circuit for each ceiling relay that includes contacts of the associated hall call relay, and time delay relays associated with at least some of the ceiling relays and arranged to delay for a time interval the energization of the lower portion of the high call reverse circuit after the previous highest call is answered.

11. In an elevator system, in combination, a plurality of elevator cars adapted to serve a plurality of floors, means for registering calls for service, a load switch for each car, a high call reverse circuit, a ceiling relay for each of at least some of the intermediate floors, a sealing circuit for each ceiling relay that includes contacts of the associated call registering means, a bypassed hall call relay that is energized through a series of normally closed contacts of the ceiling relays, circuit means including the load switch of a car and the bypassed hall call relay for energizing the ceiling relay for each floor at which a call is registered, said ceiling relays being arranged to break the high call reverse circuit and energize the portion of such circuit immediately below the highest break, and means for assigning cars to high call reverse when at least one of said ceiling relays is energized.

12. In an elevator system, in combination, a plurality of elevator cars adapted to serve a plurality of floors, means for registering calls for service from each of said floors, a load switch for each car, a high call reverse circuit for each of several zones into which said plurality of floors are divided, a ceiling relay for each of at least some of the floors in each zone, a sealing circuit for each ceiling relay that includes contacts of the associated call means, each ceiling relay being adapted to break the high call reverse circuit, means including contacts of the ceiling relays for energizing the high call reverse circuit below the highest break in each zone, a bypassed hall call relay that is energized through a series circuit of normally closed contacts of the ceiling relays, means including normally open contacts of the bypassed hall call relay and the load switch of a car for energizing the ceiling relays for all floors then having call registered, means for detecting the presence of a car in each of said zones, and means responsive to said detecting means and said high call reverse circuits for reversing an up traveling car at the floor of the highest energized ceiling relay in a lower zone in which no other car is present.

13. In an elevator system, in combination, a plurality of elevator cars arranged to serve a plurality of floors, means for registering calls for service from the various floors, means for moving the cars to serve the calls, a high call reverse circuit, means for sensing the load in a car, means for causing a loaded car to bypass calls for service, circuit dividing means energized by the load sensing means of a car arranged to divide the high call reverse circuit effectively at a point immediately below the position of the car and for separately energizing the lower portion thereof, and means for deenergizing such dividing means when the highest call below the division point is answered.

14. In an elevator system, in combination, a plurality of elevator cars arranged to serve a plurality of floors, means for registering calls for service from the various floors, means for moving the cars to serve the calls, a high call reverse circuit, means for sensing the load in a car, means for causing a loaded car to bypass calls for service, circuit dividing means for each floor energized in response to the load sensing means for a car arranged to divide the high call reverse circuit effectively at a point immediately below the position of the car and to energize the lower portion thereof provided there is no dividing means for a higher floor energized, and means for deenergizing each dividing means at the expiration of a time interval after the highest call below such dividing means is answered.

15. In an elevator system, in combination, a plurality of elevator cars arranged to serve a plurality of floors, means for registering calls for service from the various floors, means for moving the cars to serve the calls, a high call reverse circuit, means for sensing the load in a car, means for causing a loaded car to bypass calls for service, circuit dividing means for each floor arranged to divide the high call reverse circuit effectively at a point below the corresponding floor and to energize the lower portion of such circuit, means responsive to operation of the load sensing means at a floor for energizing the circuit dividing means for that floor provided no other dividing means is energized, and means responsive to the answering of the highest call at a floor below an energized dividing means for energizing the dividing means for that floor and deenergizing the dividing means for all floors above that floor.

16. In an elevator system, in combination, a plurality of cars adapted to serve traffic between a plurality of floors and a particular floor, means for registering calls for service, means for defining a continuous zone of floors within said plurality of floors to receive preferred service, means for stopping any empty cars traveling from said particular floor at the farthest call in said zone of floors requiring service toward said particular floor, and means for eliminating the floor of said farthest call and all floors more remote from the particular floor from said zone of floors as said farthest call is answered.

17. In an elevator system, in combination, a plurality of cars adapted to serve traffic between a plurality of floors and a particular floor, means for registering calls for service, means responsive to a predetermined demand for defining a continuous zone of floors within said plurality of floors to receive preferred service, means for stopping a car traveling in either direction at the farthest call in said zone requiring service toward said particular floor and conditioning said stopped car for travel toward said particular floor, and means for reducing the limits of said zone to eliminate the floor of said farthest call as said call is answered.

18. In an elevator system, in combination, a plurality of cars adapted to serve traffic between a plurality of floors and a particular floor, means for registering calls for service, means responsive to a predetermined demand for defining a continuous zone of floors to receive preferred service in which the limit of the zone remote from the particular floor is at a floor having a call for service toward the particular floor, means for stopping any car at said zone limit that can serve the call thereat, and means for locating the zone limit at the next call for service in the zone as the previous zone limit call is answered.

19. In an elevator system, in combination, a plurality of cars adapted to serve traffic between a plurality of floors and a particular floor, means for registering calls for service, means responsive to a predetermined traffic demand for defining a continuous zone of floors to receive preferred service in which calls exist at some of the floors and the limit of the zone remote from the particular floor is at a floor having one of such calls for service registered when said responsive means responded to the demand, and means for limiting the travel of cars away from said particular floor to the farthest remaining one of said existing calls as said calls are answered.

20. In an elevator system, in combination, a plurality of cars adapted to serve traffic between a plurality of floors and a particular floor, means for registering calls for service, means responsive to a predetermined demand for defining a zone of floors to receive preferred service, the limit of said zone remote from the particular floor being at a call for service toward the particular floor, means for stopping any car capable of serving the call at said limit of the zone to serve such call, means for preparing a new zone limit within the previous zone as the call at the previous limit is answered, and means for establishing a new zone limit predetermined time after the call at the previous limit is answered.

21. In an elevator system, in combination, a plurality of cars adapted to serve traffic between a plurality of floors and a particular floor, means for registering calls for service; means responsive to a predetermined demand for defining a continuous zone of floors to receive preferred service in which the limit remote from the particular floor is a call for service toward the particular floor, means for limiting travel of cars away from the particular floor to said limit, means for reducing the zone as the call at the limit is answered, and means for temporarily disabling the travel limiting means in response to a car serving said zone of floors.

22. In an elevator system, in combination, a plurality of cars adapted to serve traffic between a plurality of floors and a particular floor, means for registering calls for service, means responsive to a predetermined demand for establishing a limit of travel of said cars from said particular floor, and means responsive to the answering of the call at the limit adapted to shift said limit of travel toward said particular floor.

23. In an elevator system according to claim 22, means for disabling the travel limiting means for a predetermined time after each shift of the limit.

24. In an elevator system according to claim 23, means for disabling the travel limiting means in response to a car serving calls within the limit of travel.

25. In an elevator system according to claim 23, means for establishing a second limit of travel for cars passing the said limit during said predetermined time after a shift, and means for shifting said second limit toward said particular floor as the call at the second limit is answered.

26. In an elevator system, in combination, a plurality of cars adapted to serve traffic between a plurality of floors and a particular floor, means for registering calls for service, means responsive to a predetermined demand for defining a plurality of continuous zones of floors within said plurality of floors to receive preferred service, each of said zones being limited remotely from the particular floor by a call for service toward the particular floor, means for shifting the limit of a zone to the next call for service nearer the particular floor as the call at the limit is answered, means for stopping cars traveling away from the particular floor at the limits of said zones, and means for disabling said stopping means for the zone nearer the particular floor in response to a predetermined service to that zone.

27. An elevator system according to claim 26, in which said disabling means acts for a predetermined time after each shift of the limit of the zone.

28. An elevator system according to claim 26, in which said disabling means is responsive to a car serving calls in the zone.

References Cited in the file of this patent

UNITED STATES PATENTS 2,482,529     Williams _____ Sept. 20, 1949